(12) United States Patent
Yamada et al.

(10) Patent No.: US 12,174,381 B2
(45) Date of Patent: Dec. 24, 2024

(54) IMAGE DISPLAY DEVICE USING RETINAL SCANNING DISPLAY UNIT AND IMAGE DISPLAY SYSTEM

(71) Applicant: UNIVERSITY OF FUKUI, Fukui (JP)

(72) Inventors: Shoji Yamada, Fukui (JP); Toshio Katsuyama, Fukui (JP); Akira Nakao, Fukui (JP)

(73) Assignee: UNIVERSITY OF FUKUI, Fukui (JP)

( * ) Notice: Subject to any disclaimer, the term of this patent is extended or adjusted under 35 U.S.C. 154(b) by 526 days.

(21) Appl. No.: 17/634,404

(22) PCT Filed: Dec. 17, 2020

(86) PCT No.: PCT/JP2020/047215
§ 371 (c)(1),
(2) Date: Feb. 10, 2022

(87) PCT Pub. No.: WO2021/181797
PCT Pub. Date: Sep. 16, 2021

(65) Prior Publication Data
US 2022/0299771 A1   Sep. 22, 2022

(30) Foreign Application Priority Data
Mar. 11, 2020  (JP) .................................. 2020-042312

(51) Int. Cl.
*G02B 27/01*  (2006.01)
*F21V 8/00*  (2006.01)
(Continued)

(52) U.S. Cl.
CPC ....... *G02B 27/0172* (2013.01); *G02B 6/0008* (2013.01); *G02B 26/0816* (2013.01);
(Continued)

(58) Field of Classification Search
CPC ... G02B 2027/0105–0198; G02B 27/01–0189; G02B 26/00–129; G02B 6/00–567; G06F 3/00–167
See application file for complete search history.

(56) References Cited

U.S. PATENT DOCUMENTS

2018/0373024 A1   12/2018  Sugawara et al.
2020/0310120 A1*  10/2020  Grief .................. G02B 26/0833
2021/0080727 A1    3/2021  Yamada et al.

FOREIGN PATENT DOCUMENTS

JP    2013-195603 A    9/2013
JP    2017-116669 A    6/2017
(Continued)

OTHER PUBLICATIONS

Mar. 16, 2021 International Search Report issued in International Patent Application No. PCT/JP2020/047215.

*Primary Examiner* — Bao-Luan Q Le
*Assistant Examiner* — Christopher A Lamb, II
(74) *Attorney, Agent, or Firm* — Oliff PLC

(57) ABSTRACT

A retinal scanning display device including an optical system emits laser light to a pupil of a user, an optical multiplexer individually receives types of laser light having different wavelengths emitted from a plurality of semiconductor lasers, which combines the types of laser light coaxially to output the combined laser light. On the optical multiplexer, a beam shaper shapes the combined laser light into a light beam having a predetermined divergence or convergence angle, and a direction-of-emission changer changes image signal corresponding to an image to be formed, the direction of emission of the light beam output through the beam shaper within at least a plane intersecting the direction of emission. Then, an optical engine formed with the semiconductor lasers, the optical multiplexer, the beam shaper and the direction-of-emission changer guides (Continued)

the laser light emitted from the direction-of-emission changer to the position of the pupil of the user.

11 Claims, 16 Drawing Sheets

(51) Int. Cl.
*G02B 26/08* (2006.01)
*G02B 26/10* (2006.01)
*G02B 27/00* (2006.01)
*G06F 3/01* (2006.01)

(52) U.S. Cl.
CPC ....... *G02B 26/101* (2013.01); *G02B 27/0093* (2013.01); *G02B 27/0179* (2013.01); *G06F 3/013* (2013.01); *G02B 2027/011* (2013.01); *G02B 2027/014* (2013.01); *G02B 2027/0178* (2013.01); *G02B 2027/0187* (2013.01)

(56) References Cited

FOREIGN PATENT DOCUMENTS

| | | |
|---|---|---|
| WO | 2006/118057 A1 | 11/2006 |
| WO | 2019/155916 A1 | 8/2019 |

\* cited by examiner

V-V CROSS-SECTIONAL VIEW

IMAGE DISPLAY DEVICE USING RETINAL SCANNING DISPLAY UNIT AND IMAGE DISPLAY SYSTEM

CROSS-REFERENCE TO RELATED APPLICATION

The present application claims priority from Japanese application P2020-42312 filed on Mar. 11, 2020, the content of which is hereby incorporated by reference into this application.

BACKGROUND

Field

The present disclosure relates to an image display technology which uses a retinal scanning display unit.

Related Art

Conventionally, various display devices are proposed which cover the field of view of a person (hereinafter referred to as a user) as much as possible so as to enhance the sense of immersion of the user. For example, Japanese Unexamined Patent Application Publication No. 2017-116669A1 and the like propose various technologies in which as in a head-mounted display, a display device is arranged close to eyes to increase the rate of coverage of the field of view, an image is formed as a virtual image to move the position of the image away from the user and thus both a reduction in the size of the display device and the facilitation of the sense of immersion are achieved.

SUMMARY

However, in the conventional display device as described above, it is necessary to accurately apply laser light for forming an image to the pupils of the user, and thus it is disadvantageously difficult to control an optical system. Although in order to guide the laser light to the pupils of the user, it is necessary to perform various types of control such as the control of the position of a light emitter such as a laser diode in the directions of three axes and the control of the positions of a lens, a light guide path and the like, in a device in which a large number of optical elements are combined together, it is difficult to regulate the positions of the pupils to which the laser light is applied with respect to the movement of the pupils of the user and to regulate the focus position of the laser light on the optical system.

The present disclosure is made in view of the foregoing problems and is able to be realized in the following aspects.

As one aspect, a retinal scanning display device is provided which includes an optical system that emits, to a pupil of a user, a plurality of types of laser light having different wavelengths in a range of visible light. The retinal scanning display device includes: a plurality of semiconductor lasers that respectively emit the types of laser light having different wavelengths; an optical multiplexer to which a plurality of the semiconductor lasers are attached, which individually receives the types of laser light having different wavelengths emitted from a plurality of the semiconductor lasers and which combines the types of laser light coaxially with a predetermined optical axis to output the combined laser light; a beam shaper that is provided on an output side of the optical multiplexer and that shapes the combined laser light output from the optical multiplexer into a light beam having a predetermined divergence or convergence angle; a direction-of-emission changer that changes, according to an image signal corresponding to an image to be formed, the direction of emission of the combined light beam output through the beam shaper within at least a plane intersecting the direction of emission; a detector that detects the position of the pupil of the user; and a regulator that integrally moves, according to the detected position of the pupil, an optical engine formed with the semiconductor lasers, the optical multiplexer and the direction-of-emission changer so as to guide the light beam emitted from the direction-of-emission changer to the position of the pupil of the user.

Since the retinal scanning display device is able to integrally move the optical engine formed with the semiconductor lasers, the optical multiplexer and the direction-of-emission changer, the retinal scanning display device integrally moves, according to the detected position of the pupil, the optical engine so as to be able to easily guide the light beam emitted from the direction-of-emission changer to the position of the pupil of the user.

DETAILED DESCRIPTION

Figure 1:
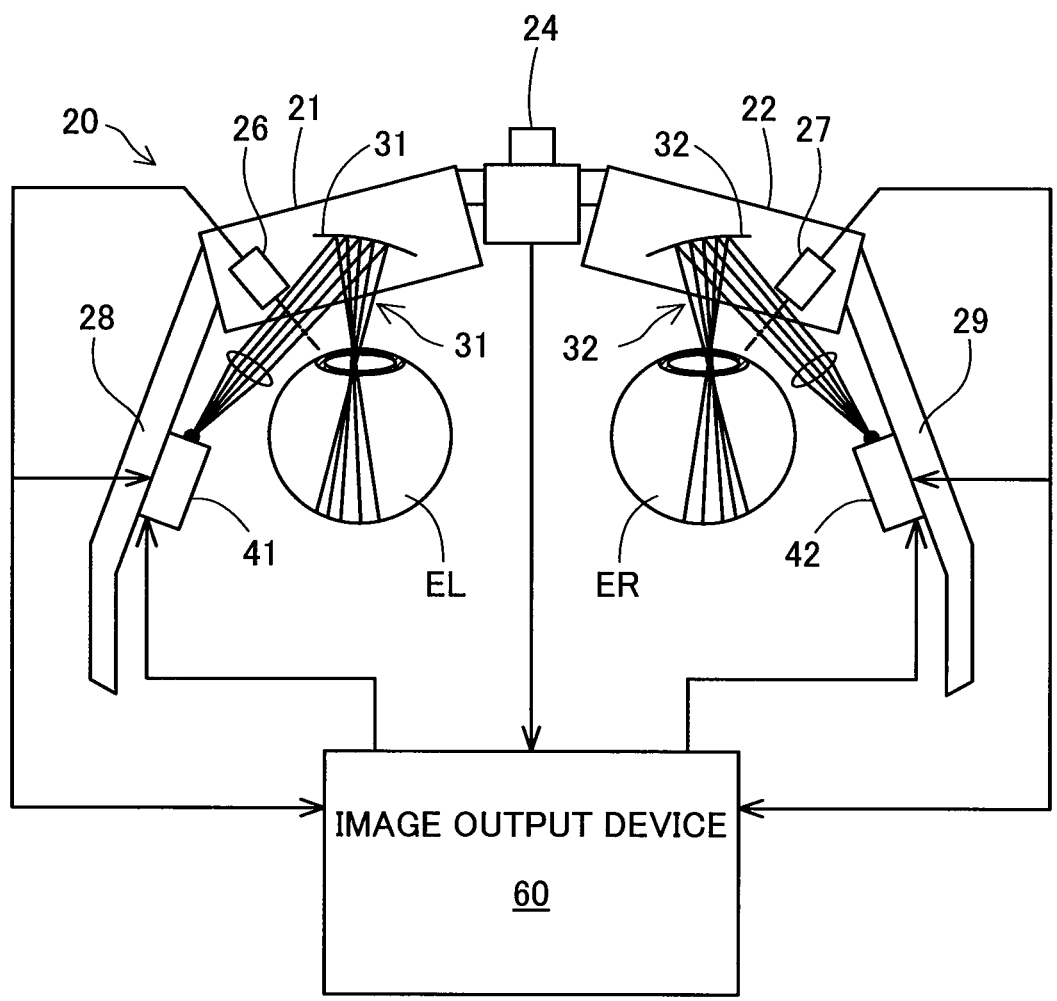
FIG. 1 is a schematic configuration view showing a schematic configuration of a retinal scanning display device.

A. Retinal Scanning Display Device (1) Overall Configuration:

The configuration of a retinal scanning display device 20 according to an embodiment of the present disclosure will be described. FIG. 1 is a schematic configuration view of the retinal scanning display device 20. FIG. 1 also shows an image output device 60 which exchanges image signals and the like with the retinal scanning display device 20 to display an image on the retinal scanning display device 20. The retinal scanning display device 20 is a so-called "see-through type" display unit, and a user USR is able to visually recognize the external world even in a state where the retinal scanning display unit 20 is fitted to the user USR. The retinal scanning display device 20 includes a video camera 24 in the center thereof, and includes display configurations on the left and right sides thereof such that they are arranged symmetrically. Specifically, in the retinal scanning display device 20, not only see-through type transparent display units 21 and 22 and temples 28 and 29 which are fitted to the head of the user USR but also eye cameras 26 and 27 which detect the directions of left and right eyeballs EL and ER, relay optical paths 31 and 32 which are provided within the transparent display units 21 and 22, optical modules 41 and 42 which emit laser light and the like are provided symmetrically.

The transparent display units 21 and 22 are configured as half mirrors or holographic elements, and the user who wears the retinal scanning display device 20 is able to visually recognize an outside view transparently. Hence, the user is able to superimpose images formed with the optical modules 41 and 42 on the outside view and visually recognize them. When the retinal scanning display device 20 is utilized by combination with a panel display device 50 as will be described later, the outside view is preferably able to be visually recognized in parts other than a central field of vision, and the central field of vision does not necessarily need to be transparent. The central field of vision may be transparent or non-transparent, and furthermore, the degree of transparency may be low (semi-transparent).

Although the detailed configuration of the optical modules 41 and 42 will be described later, the optical modules 41 and 42 incorporate semiconductor lasers therein which emit light in three colors RGB and use multiplexers to integrate the light in the RGB from the semiconductor lasers on each of optical waveguides. The light emitted from the optical waveguides is reflected off reflectors to be guided to the relay optical paths 31 and 32. The angles of the reflectors are changed with actuators such that the emitted laser light is scanned, then the output intensities of the semiconductor lasers are controlled according to the scanning and thus images are directly formed on the retinas of the left and right eyes EL and ER of the user USR, with the result that the user is caused to visually recognize them.

The video camera 24 provided in the center of the retinal scanning display device 20 images the frontward area of the user USR to form an image, and outputs the picture signals thereof to the image output device 60. The eye cameras 26 and 27 image the left and right eyeballs EL and ER of the user USR, and output the image signals thereof to the image output device 60 and the optical modules 41 and 42. The image signals from the eye cameras 26 and 27 are also directly input to the optical modules 41 and 42 so that a processing time necessary for the control of the positions of the optical modules 41 and 42 is reduced. A configuration may be originally adopted in which the image signals from the eye cameras 26 and 27 are output through the image output device 60 to the optical modules 41 and 42. In this case, the image signals from the eye cameras 26 and 27 may be processed by the image output device 60, and the processed image signals may be output as the positions of the eyes (X and Y coordinates) to the optical modules 41 and 42. The processing of the signals performed by the image output device 60, that is, the processing of the picture signals from the video camera 24 and the processing of the image signals from the eye cameras 26 and 27 will be described in detail later as an image display system 10.

(2) Overall Configuration of Optical Modules:

The configuration and the function of the optical modules 41 and 42 will be described. Since the optical modules 41 and 42 are provided symmetrically, and the configurations thereof are the same as each other, the optical module 41 for the left eye will be described below. The configuration and the function of the optical module 42 for the right eye are also the same.

Figure 2:
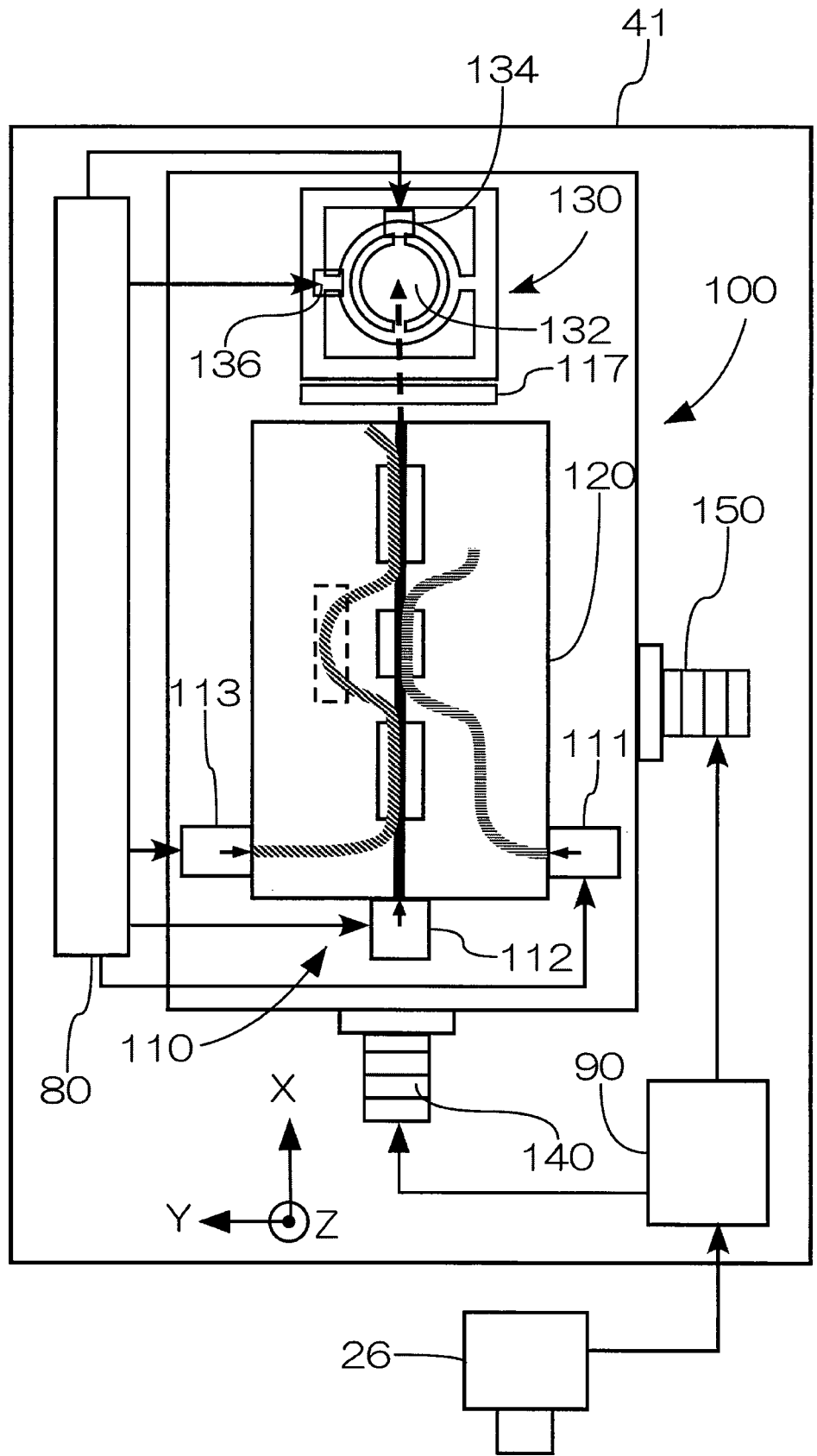
FIG. 2 is an illustrative view showing the configuration of an optical module.

FIG. 2 is an illustrative view schematically showing the overall configuration of the optical module 41. As shown in the figure, the optical module 41 includes an optical engine 100, a first movement unit 140 for moving the optical engine 100, a second movement unit 150 for the same purpose, an optical control unit 80 and a movement control unit 90. A direction in which the optical engine 100 is moved by the first movement unit 140 is referred to as an X axis direction, a direction in which the optical engine 100 is moved by the second movement unit 150 is referred to as a Y axis direction and a direction which is orthogonal to the X axis and the Y axis is referred to as a Z axis direction. The X, Y and Z axes are also shown in other figures.

The first and second movement units 140 and 150 are piezoelectric bimorph actuators, and indicate the amount of extension corresponding to a voltage which is applied. One end of the first movement unit 140 is fixed to a back end of the base 101, which will be described later, of the optical engine 100 in the X axis direction, and the other end is fixed to an unillustrated frame of the optical module 41. Likewise, one end of the second movement unit 150 is fixed to a back end of the base 101 in the Y axis direction, and the other end is fixed to the frame of the optical module 41. The first and second movement units 140 and 150 are electrically connected to the movement control unit 90, and extend or retract according to a voltage signal output by the movement control unit 90 to displace the position of the optical engine 100 in each of the axis directions. The image signal from the eye camera 26 is input to the movement control unit 90. The configuration and the function of the movement control unit 90 will be described later.

The configuration of the optical engine 100 will be described also with reference to FIG. 3 which is a perspective view showing the structure of the optical engine 100. In the optical engine 100, a light source module 110, a collimating lens 117 and a MEMS mirror unit (hereinafter simply referred to as a mirror unit) 130 are provided on the base 101. The collimating lens 117 is provided on the output side of the light source module 110, and on the outside thereof, the mirror unit 130 is further arranged. In the present embodiment, the base 101 is made of metal. The light source module 110 includes semiconductor lasers 111 to 113 which emit laser light in each color RGB and a planar optical multiplexer 120 to which the laser light from these semiconductor lasers is applied. The collimating lens 117 is provided in a position a focal distance f0, that is, a distance f0 apart from the output end of the light source module 110. Therefore, in this embodiment, the laser light is shaped into a light beam which is parallel light with the collimating lens 117 serving as a beam shaper. Hence, the light beam applied to the relay optical paths 31 and 32 is parallel light, the relay optical paths 31 and 32 have an optically symmetrical structure as will be described later (FIG. 7) and thus a virtual image presentation distance is infinity. Preferably, when an optical system which does not have an optically symmetrical structure is adopted or the virtual image presentation position is a finite distance, the position of the collimating lens 117 and the focal distance are changed to prevent the light beam emitted from the collimating lens 117 from being shaped into parallel light and the divergence angle of the light beam emitted from the collimating lens 117 is regulated such that the light beam applied to the pupil of the user is a diverged beam and has an angle corresponding to the virtual image presentation distance. Although a beam which is applied to the pupil is generally a diverged beam which is diverged from a point light source in a virtual image position, a converged beam may be used for the purpose of a corrected display for an extremely myopic observer. A beam between optical elements in a coupling optical system from the mirror unit 130 to the pupil may be any one of a diverged beam, a converged beam and a parallel beam. When in the present specification, the divergence angle of the diverged beam and the convergence angle of the converged beam are mentioned, the divergence angle and the convergence angle include an angle of 0 degrees.

The mirror unit 130 to which the light beam shaped into the parallel light with the collimating lens 117 is applied includes a mirror for reflection 132, a first actuator 134 and a second actuator 136. The mirror 132 is supported to be able to rotate around a first shaft, and a frame member which supports the first shaft is supported with a second shaft orthogonal to the first shaft. The first actuator 134 includes a coil (not shown) which is formed on the circumference of the mirror 132 by utilization of a semiconductor process, and uses a Lorentz force produced by a current flowing through the coil to rotate the mirror 132 about the first shaft. The second actuator 136 includes a coil (not shown) which is produced in the frame member by utilization of the semiconductor process, and uses a Lorentz force produced by a current flowing through the coil to rotate the mirror 132 together with the frame member about the second shaft. The first actuator 134 and the second actuator 136 as well as the semiconductor lasers 111 to 113 are electrically connected to the optical control unit 80.

Figure 3:
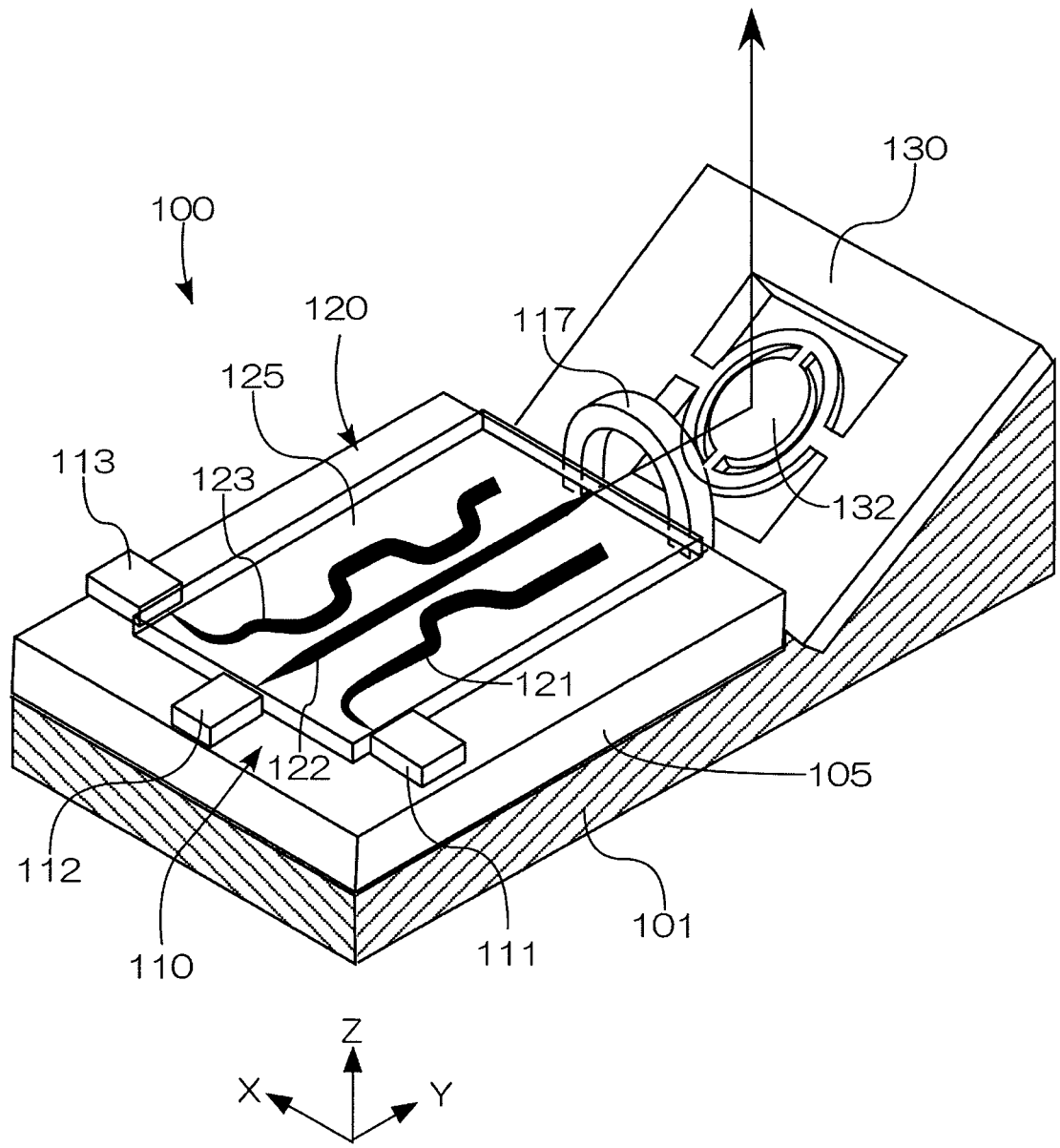
FIG. 3 is a perspective view showing the configuration of an optical engine.

As shown in FIG. 3, the light source module 110 of the optical engine 100 includes a silicon substrate 105 mounted on the base 101, and the planar optical multiplexer 120 is mounted on the silicon substrate 105. The structures and the connection relationship of the semiconductor lasers 111 to 113 and the planar optical multiplexer 120 which configure the light source module 110 will be described later.

Figure 4:
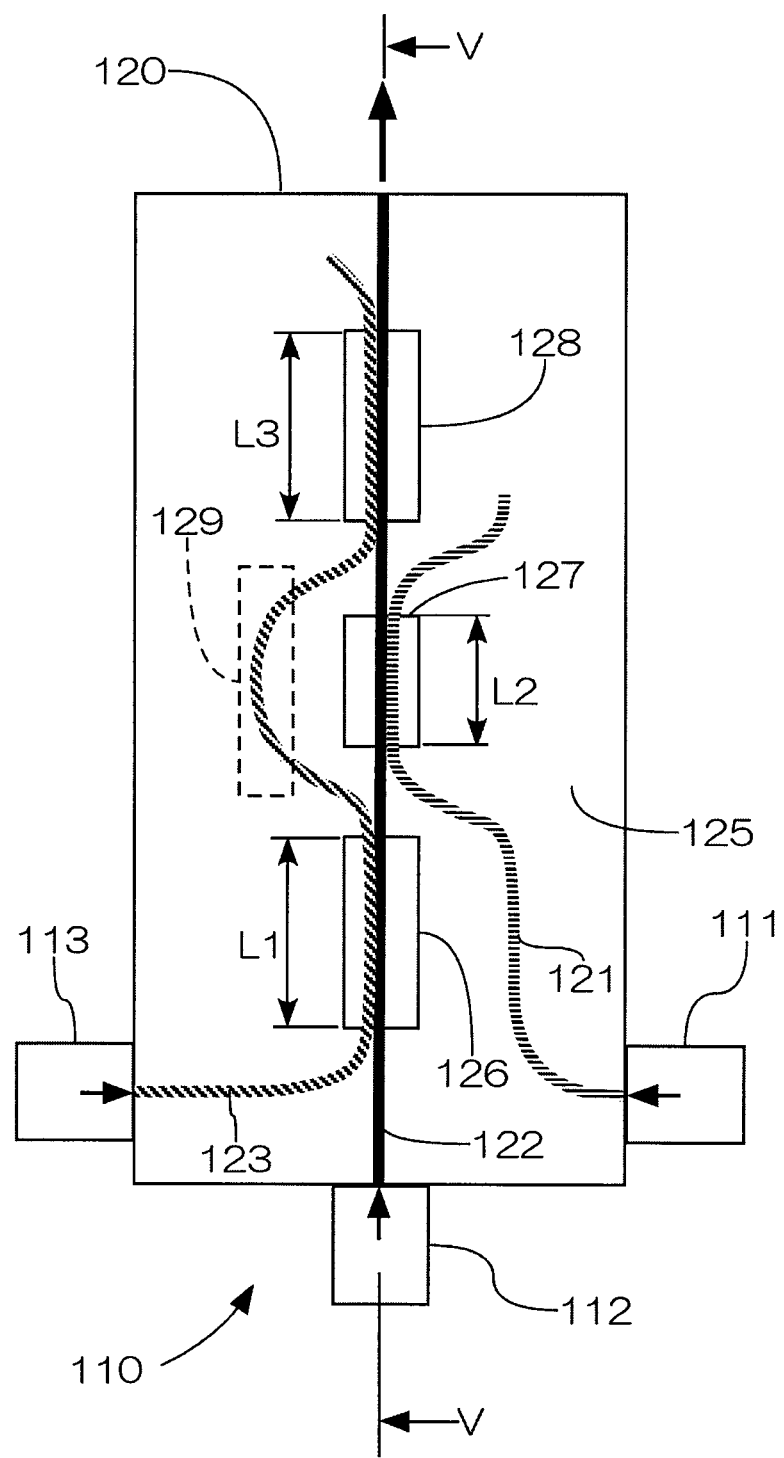
FIG. 4 is an illustrative view for illustrating a planar optical multiplexer.

FIG. 4 is an illustrative view for illustrating the operation of the planar optical multiplexer 120. Each of three types of visible light which are coupled with the planar optical multiplexer 120 of the light source module 110 is monochromatic light, and one of them is first visible light (red light) which is output by the semiconductor laser 111. The wavelength of the first visible light is the longest. Another one is second visible light (green light) which is output by the semiconductor laser 112. The wavelength of the second visible light is shorter than that of the first visible light. The last one is third visible light (blue light) which is output by the semiconductor laser 113. The wavelength of the third visible light is the shortest, and a wavelength interval between the second visible light and the third visible light is shorter than a wavelength interval between the first visible light and the second visible light.

In the present embodiment, as three types of visible light whose wavelengths are different, the red light (R), the green light (G) and the blue light (B) described above are used. In general, the wavelength $\lambda R$ of the red light is in a range of 620 to 750 nm, the wavelength $\lambda G$ of the green light is in a range of 495 to 570 nm and the wavelength $\lambda B$ of the blue light is in a range of 450 to 495 nm, and a relationship of $\lambda B < \lambda G < \lambda R$ is established among the three wavelengths of RGB. For example, in the present embodiment, among the wavelength ranges described above, as the semiconductor laser 111, a laser which emits red light of wavelength $\lambda R=640$ nm is selected, as the semiconductor laser 112, a laser which emits green light of wavelength $\lambda G=520$ nm is selected and as the semiconductor laser 113, a laser which emits blue light of wavelength $\lambda B=455$ nm is selected such that a relationship of $\lambda R-\lambda G > \lambda G-\lambda B$ is established. In the following description, the semiconductor lasers 111 to 113 are respectively referred to as the red laser 111, the green laser 112 and the blue laser 113 so that they are distinguished. These lasers are mounted on the planar optical multiplexer 120 including the silicon substrate 105 as a constituent component such that a wall surface for emitting the laser light is joined through a slight gap to a light guide port provided in the planar optical multiplexer 120. The semiconductor lasers 111 to 113 are located with a known locating device such that an optical axis in the position of the wall surface for emitting the laser light is aligned with the light guide port of the planar optical multiplexer 120. When the semiconductor laser and the planar optical multiplexer 120 are able to be configured of the same semiconductor material, both of them may be produced on the same semiconductor substrate. When they are produced on the same semiconductor substrate, it is easy to align the optical axes thereof.

Figure 5:
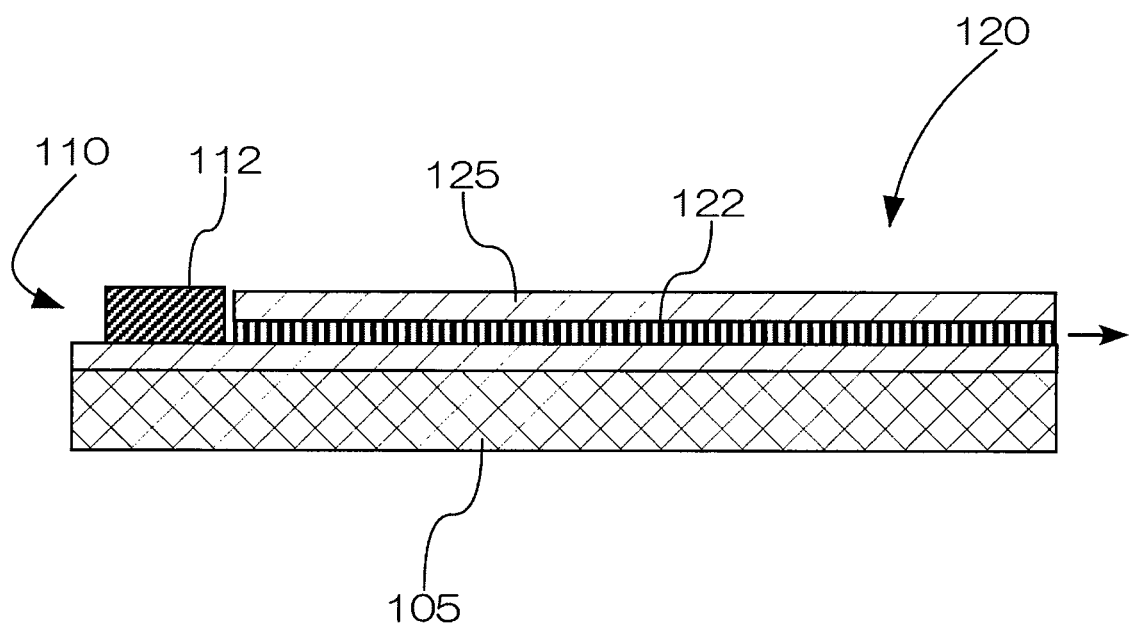
FIG. 5 is a cross-sectional view taken along line V-V in FIG. 4.

The planar optical multiplexer 120 of the light source module 110 includes a clad layer 125 which is formed with a $SiO_2$ layer on the silicon substrate 105 and a first waveguide 121, a second waveguide 122 and a third waveguide 123 which are formed in the clad layer 125 and are arranged within a plane parallel to the silicon substrate 105. Hence, the clad layer 125 is present above and below the first to third waveguides 121 to 123. The planar optical multiplexer 120 has a monolithic structure in which layers are separately stacked by the semiconductor process and are arranged on the silicon substrate 105. This structure is shown in FIG. 5 which is a cross-sectional view taken along line V-V in FIG. 4. Although FIG. 5 shows the second waveguide 122, the other waveguides have basically the same structure. In the first waveguide 121, the second waveguide 122 and the third waveguide 123, end portions are exposed to one side surface of the clad layer 125. In the end portions of the first to third waveguides 121 to 123 of the planar optical multiplexer 120, structures for mounting the semiconductor lasers 111 to 113 are formed by etching, and the light guide ports of the waveguides are provided. The light guide ports of the first waveguide 121, the second waveguide 122 and the third waveguide 123 and the emission portions of the red laser 111, the green laser 112 and the blue laser 113 are located a slight distance apart from each other so as to be opposite each other. The red light (R), the green light (G) and the blue light (B) in a single mode from the semiconductor lasers are applied to the guide light ports described above, and the types of light in the colors RGB are coupled while being respectively propagated through the first waveguide 121, the second waveguide 122 and the third waveguide 123 and are emitted from the emission port of the second waveguide 122 which is exposed to the other surface of the clad layer 125.

The first waveguide 121, the second waveguide 122 and the third waveguide 123 are arranged at such intervals that light coupling is prevented from occurring. On the propagation path of the visible light in the second waveguide 122, a first multiplexer unit 126, a second multiplexer unit 127 and a third multiplexer unit 128 are provided in this order from the side to which the laser light is applied. The first multiplexer unit 126, the second multiplexer unit 127 and the third multiplexer unit 128 are configured as directional couplers, in the first multiplexer unit 126 and the third multiplexer unit 128, the third waveguide 123 is in contact with the second waveguide 122, in the second multiplexer unit 127, the first waveguide 121 is in contact with the second waveguide 122 and thus the types of light in the colors RGB are coupled together. In the directional couplers, even when the physical lengths (lengths L1, L2 and L3 in FIG. 2) of the waveguides are equal to each other, if the wavelength of the light passing through the waveguide is different, the degree of transfer of the light energy applied to one waveguide to the other waveguide is different. In other words, the strength of coupling in the waveguide of the directional coupler is determined by the physical length (hereinafter referred to as the length of a coupler unit or the length of the waveguide in the coupler unit) and the wavelength of the light passing through the coupler unit. In the directional coupler, the length of the coupler unit in which all of light energy of a certain wavelength that is applied to one waveguide is emitted from the other waveguide is referred to as a mode coupling length or is simply referred to as a coupling length. In other words, the coupling length corresponds to the strength of coupling between the waveguides of the coupler units and is specified as a function of a wavelength.

This respect will be described using the second multiplexer unit 127 as an example. The physical length of the second multiplexer unit 127 is L2. The coupling length of the second multiplexer unit 127 differs depending on the wavelength of light passing through the second multiplexer unit 127, and the coupling length is L2R for red light and is L2B for bule light. In the second multiplexer unit 127, a relationship of L2R<<L2B is established, the red light is coupled more strongly than the blue light and a waveguide structure including the length L2 of the coupler is designed such that the light transfers between the waveguides over a short propagation distance. Here, when a setting is made such that the length L2 of the coupler unit in the second multiplexer unit 127 is equal to the coupling length L2R, almost 100% energy of the red light transfers from the first waveguide 121 to the second waveguide 122 whereas since the length L2 of the coupler unit is sufficiently shorter than the coupling length L2B of the blue light, the amount of transfer of the blue light between the waveguides is small.

In this embodiment, the coupling length of the first waveguide 121 and the second waveguide 122, that is, the length L2 of the waveguide in the second multiplexer unit 127 is equal to the coupling length L2R, and thus almost 100% energy of the red light applied from the red laser 111 to the first waveguide 121 transfers to the second waveguide 122 with the second multiplexer unit 127. On the other hand, almost 100% energy of light applied to the third waveguide 123 transfers to the second waveguide 122 with the first multiplexer unit 126 and the third multiplexer unit 128. The length of the coupler unit between the waveguides is the total of the length of the first multiplexer unit 126 and the length L3 of the third multiplexer unit 128, and the length of L1+L3 described above is equal to the coupling length for the blue light from the blue laser 113. In the present embodiment, the length L1 of the first multiplexer unit 126 is equal to the length L3 of the third multiplexer unit 128. The length L2 of the second multiplexer unit 127 is set to be almost half of the length L1 of the first multiplexer unit 126 or the length L3 of the third multiplexer unit 128. In examples of specific dimensions of the lengths L1, L2 and L3 when three types of visible light are the types of light in the colors RGB, each of the lengths L1 and L3 is about 1800 μm, and the length L2 is about 900 μm.

In the first multiplexer unit 126, the green light in the second waveguide 122 is propagated to the third waveguide 123 by mode coupling, and half of the blue light in the third waveguide 123 is propagated to the second waveguide 122 by mode coupling. In the first multiplexer unit 126, almost 100% energy of the green light in the second waveguide 122 is preferably propagated to the third waveguide 123. In the second multiplexer unit 127, the red light in the first waveguide 121 is propagated to the second waveguide 122 by mode coupling. In the second multiplexer unit 127, almost 100% energy of the red light in the first waveguide 121 is preferably propagated to the second waveguide 122. Preferably, the blue light propagated to the second waveguide 122 is not propagated to the first waveguide 121 as much as possible.

In the third multiplexer unit 128, the red light propagated to the second waveguide 122 is propagated to the third waveguide 123 by mode coupling and is thereafter propagated to the second waveguide 122. The green light propagated to the third waveguide 123 is propagated to the second waveguide 122 by mode coupling, and the blue light in the third waveguide 123 and the blue light in the second waveguide 122 are phase-matched to be coupled together. In the third multiplexer unit 128, almost 100% energy of the red light, the green light and the blue light in the third waveguide is preferably propagated to the second waveguide 122.

Partway through the third waveguide 123 from the first multiplexer unit 126 to the third multiplexer unit 128, a phase control unit 129 is provided. The length of the phase control unit 129 is regulated such that the phase of the blue light (B) propagated through the second waveguide 122 after passing through the first multiplexer unit 126 matches the phase of the blue light (B) propagated through the third waveguide 123 after passing through the first multiplexer unit 126.

The planar optical multiplexer 120 configured as described above is able to be formed by chemical vapor deposition (CVD), sputtering and the like which are known. For example, a silicon oxide film which serves as the clad layer 125 and has a low refractive index is formed on the silicon substrate 105 by chemical vapor deposition, and then a silicon oxide film which serves as a core layer and has a high refractive index is stacked in layers. Thereafter, a photomask which has a pattern corresponding to each of the shapes of the first to third waveguides 121 to 123 is used to pattern the core layer as an optical waveguide core having a given width by photolithography.

Thereafter, the silicon oxide film which serves as the clad layer 125 and has a low refractive index is stacked thereon to cover the optical waveguide core. In this way, the first to third waveguides 121 to 123 are formed on the silicon substrate 105 with the optical waveguide core and the clad layer 125 therearound. As the clad layer, for example, a clad layer which has an absolute refractive index of about 1.46 may be used, and as the core layer, a core layer which has a core diameter of about 2 μm and in which a difference in refractive index from the clad layer is about 0.5% may be used.

Finally, both end surfaces of the silicon substrate 105 and the clad layer 125 are polished to expose the incident ports of the first to third waveguides 121 to 123 and the emission port of the second waveguide 122, with the result that the planar optical multiplexer 120 is completed. In the planar optical multiplexer 120 formed as described above, the red light applied from the red laser 111 to the first waveguide 121 transfers to the second waveguide 122, and the blue light applied from the blue laser 113 to the third waveguide 123 transfers to the second waveguide 122, with the result that the types of light in the colors RGB are combined together and emitted from the emission port of the second waveguide 122. Since the operating principle of the planar optical multiplexer 120 described above is known as disclosed in Japanese Unexamined Patent Application Publication No. 2013-195603A1, the description thereof will be omitted.

Figure 6:
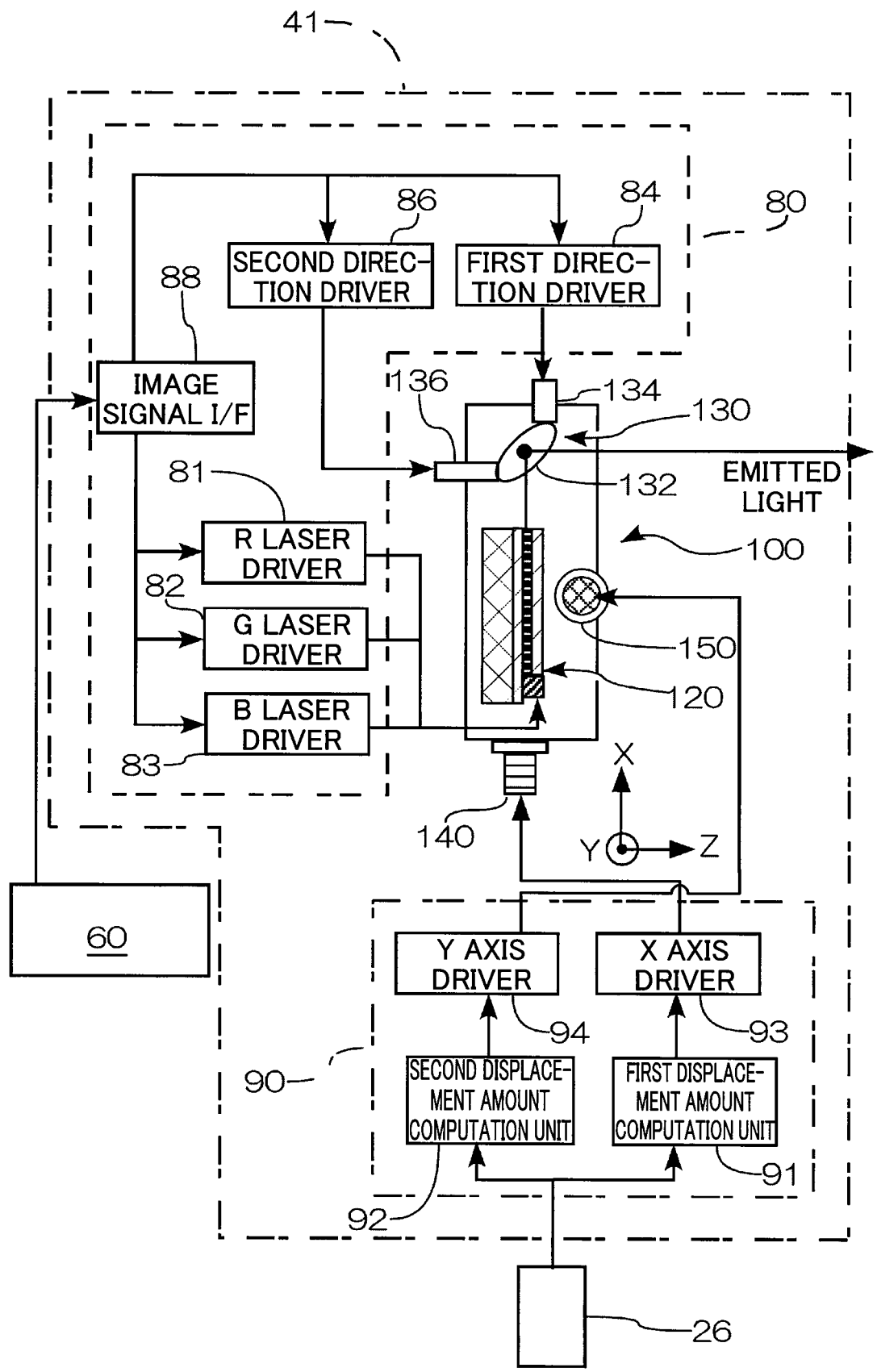
FIG. 6 is an illustrative view showing the electrical configuration of the optical module.

(3) Control for Following Position of Pupil:

The configurations and operations of the optical control unit 80 and the movement control unit 90 in the optical module 41 will then be described with reference to FIG. 6. As shown in the figure, the optical control unit 80 includes: a R laser driver 81, a G laser driver 82 and a B laser driver 83 which respectively drive the red laser 111, the green laser 112 and the blue laser 113 in the light source module 110; first and second direction drivers 84 and 86 which drive the first and second actuators 134 and 136 in the mirror unit 130; and an image signal interface (I/F) 88 which passes signals from the image output device 60 to these units. Hence, the image output device 60 drives the first and second actuators 134 and 136 through the first and second direction drivers 84 and 86, drives the red, green and blue lasers 111 to 113 through the R, G and B laser drivers 81 to 83 while scanning the angle of the mirror 132, that is, the direction of emission of the laser light within a two-dimensional plane and thereby controls the position of the laser light output from the optical engine 100 through the relay optical path 31 and the color thereof (degree of color mixing of RGB and brightness thereof), with the result that an image is able to be formed.

On the other hand, as shown in the figure, the movement control unit 90 provided in the optical module 41 includes: a first displacement amount computation unit 91 which is connected to the eye camera 26 and analyzes the image signals from the eye camera 26 to compute the amount of displacement of the pupil in the X axis direction; a second displacement amount computation unit 92 which likewise computes the amount of displacement of the pupil in the Y axis direction; an X axis driver 93 which drives the first movement unit 140 based on the amount of displacement of the pupil in the X axis direction that is determined by the first displacement amount computation unit 91; a Y axis driver 94 which drives the second movement unit 150 based on the amount of displacement of the pupil in the Y axis direction that is determined by the second displacement amount computation unit 92; and the like.

Figure 7:
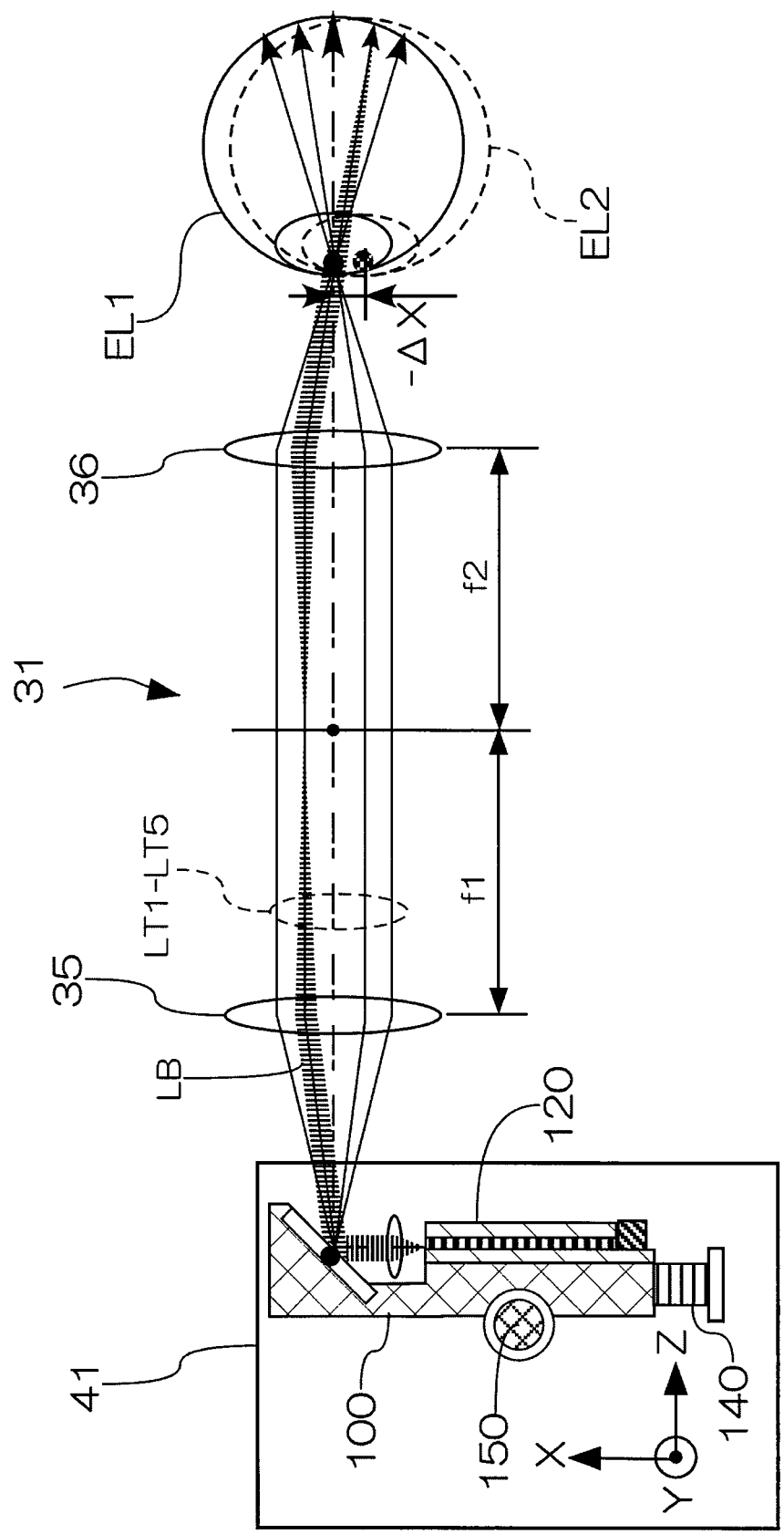
FIG. 7 is an illustrative view showing an optical path from the optical module to an eyeball.

Hence, when the positions of the pupil are displaced, the position in the X axis direction and the position in the Y axis direction of the optical engine 100 within the optical module 41 are moved by the movement control unit 90, and the position of the laser light emitted from the optical engine 100 follows the positions of the pupil. This operation will be described with reference to FIGS. 7 and 8. FIG. 7 schematically shows an optical path along which the laser light output from the optical module 41 reaches the left eye EL of the user. The relay optical path 31 is configured as an optical path which includes two collimating lenses 35 and 36 between the optical module 41 and the left eye EL of the user. In this embodiment, the collimating lens 35 and the collimating lens 36 are arranged a total distance of focal distances f1 and f2 apart from each other, and each focal distances f1 and f2 of the two collimating lenses 35 and 36 is assumed to be equal to each other. Hence, the output side and the image formation side of the laser light are configured to be in a conjugated relationship. Although in the actual relay optical path 31, as illustrated in FIG. 1, the collimating lens 36 is configured not as a lens but as a reflector, they are optically equivalent. In the relay optical path 31 shown in FIGS. 7 and 8, the virtual image presentation position is infinity, and thus the light beam applied to the pupil is parallel light. Furthermore, since the relay optical path 31 has an optically symmetrical structure, the light beam output from the optical module 41 is also parallel light. Preferably, when an optical system which does not have an optically symmetrical structure is adopted or the virtual image presentation position is a finite distance, the position of the collimating lens 117 and the focal distance are changed to prevent the light beam emitted from the collimating lens 117 from being shaped into parallel light and the divergence angle of the light beam emitted from the collimating lens 117 is regulated such that the divergence angle of the light beam applied to the pupil of the user is an angle corresponding to the virtual image presentation distance. Since a method for determining the divergence angle or the convergence angle necessary for the light beam emitted from the optical engine based on the virtual image presentation distance and the configuration of the relay optical system is known, the description thereof will be omitted. Although there is a case where the light beam is a converged beam, this case has already been described.

Figure 8:
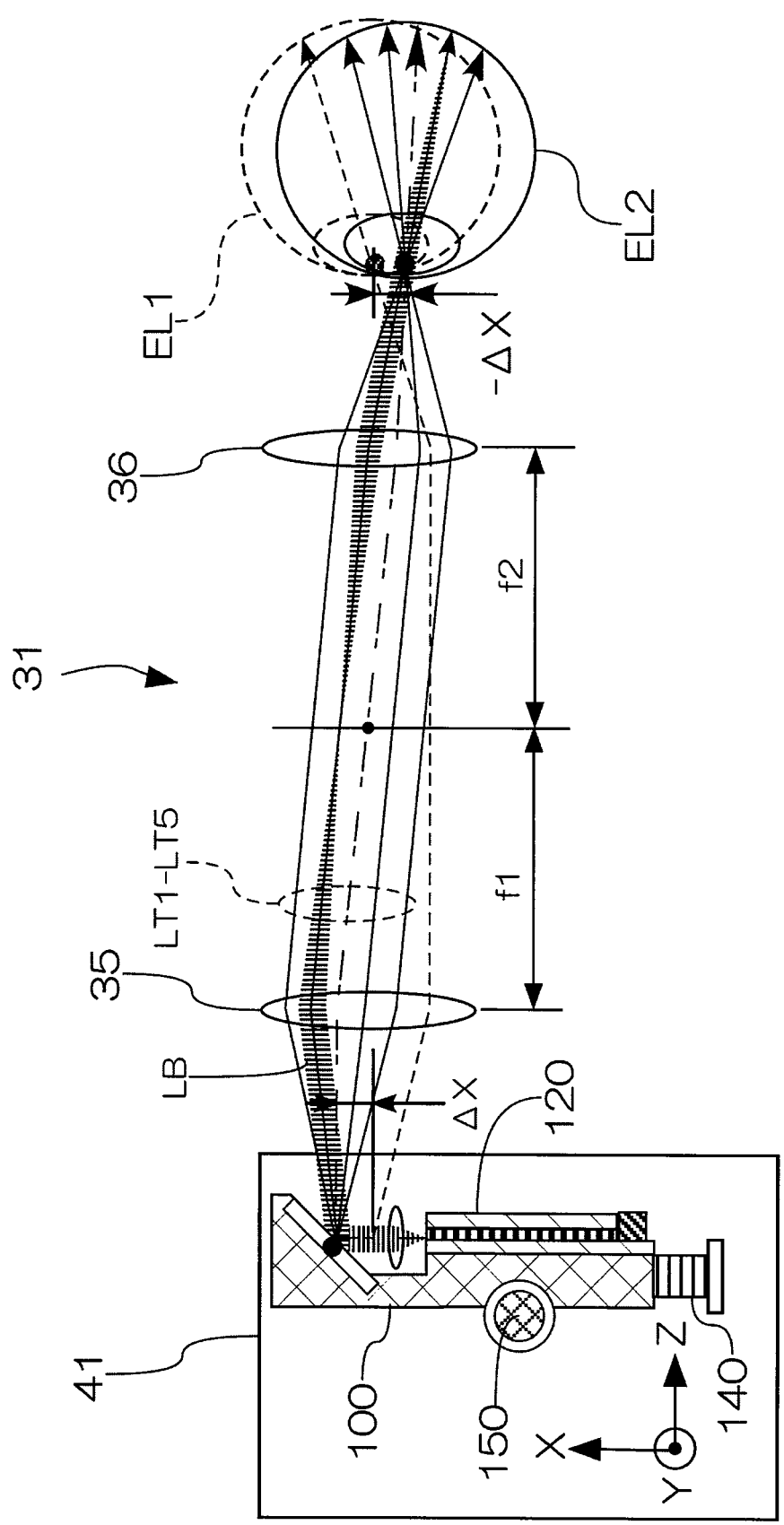
FIG. 8 is an illustrative view showing the movement of the optical module which follows the movement of the eyeball.

In FIG. 7, the center of the pupil in the left eye EL of the user who uses the retinal scanning display device 20 is assumed to coincide with the optical axis of the laser light emitted from the optical module 41. The left eye in this case is represented by reference sign EL1 The light emitted from the output end of the planar optical multiplexer 120 enters the collimating lens 117 fixed at a location the focal distance f0 apart and is focused into the light beam LB which is parallel light. Although the light beam LB is parallel light which has a given width and the diameter of the beam is about 1 mm, the figure is schematically shown. When the angle of the mirror 132 in the mirror unit 130 of the optical engine 100 is changed, the optical axis of each light beam is changed according to the angle. FIGS. 7 and 8 illustrate the ray axes LT1 to LT5 of five light beams which are applied to different positions of the collimating lens 35 in the X axis direction. An image formed on the retina of the user is formed by continuously regulating the outputs of the semiconductor lasers 111 to 113 while sequentially changing the angle of the mirror 132 in the X axis direction and in the Y axis direction. When the angle of the mirror 132 is changed, the output angle of the laser light is changed, and thus the angle of the optical axis of the light beam entering the center of the pupil in the left eye EL1 is changed, with the result that the position on the retina of the left eye EL1 where the image is formed is changed. The outputs of the semiconductor lasers 111 to 113 are modulated in each position, that is, in each pixel, and thus a color image is formed. As the modulation of the semiconductor lasers 111 to 113, intensity modulation, pulse width modulation or the like is able to be adopted.

When attention is focused on one light beam, as shown in the figure, the light beam shaped into parallel light with the collimating lens 117 enters the collimating lens 35 to be focused on a position of the focal distance f1 and form an image. The light emitted from the position where the image is formed enters, while diverging, the collimating lens 36 provided in a position the focal distance f2 apart to be shaped into parallel light, and enters the pupil of the user.

This relationship is the same in the ray axes TL1 to TL5 or in any position therebetween.

However, when it is assumed that the position of the left eye EL1 of the user is changed relative to the retinal scanning display device 20, for example, when it is assumed that the position is displaced a distance ΔX to the opposite side in the X axis direction and is moved to a position indicated by reference sign EL2 in the figure, the position of the optical axis of the laser light emitted by the optical module 41 is displaced from the center of the pupil of the left eye EL2 of the user by the distance ΔX to the opposite side in the X axis direction. In the figure, this displacement is indicated by a distance −ΔX. In this case, it is difficult to form an image in a desired position, and for the user, part of the image is not seen or binocular vision cooperating with the right eye is not satisfactorily achieved.

Hence, in the retinal scanning display device 20 of the present embodiment, the movement of the left eye EL of the user as described above is detected with the eye camera 26, and when the pupil is moved the distance −ΔX along the X axis, the movement control unit 90 described above is used to move the optical engine 100 the distance ΔX in the X axis direction so as to compensate for the movement of the pupil described above. FIG. 8 shows a state where the optical engine 100 is moved the distance ΔX in the X axis direction. Even when the optical engine 100 is moved, since the range of the rotation angle of the mirror 132 is not changed at all, the ray axes TL1 to TL5 from the optical engine 100 to the collimating lens 35 are not changed. However, the optical engine 100 is moved the distance ΔX in the X axis direction, and thus the positions where the ray axes TL1 to TL5 enter the collimating lens 35 are changed. Consequently, the position where the light beam enters the collimating lens 35 and the direction of emission of the rays from the collimating lens 35 are changed but the position where the light beam LB is focused, that is, the position where the image is formed is the position of focus of the collimating lens 35 so as not to be changed.

Although the light emitted from the position where the image is formed enters, while diverging, the collimating lens 36 provided in a position the focal distance f2 apart, since the input side and the output side of the relay optical path 31 are in a conjugated relationship, the angle at which the light enters the collimating lens 36 and the position where the light enters the collimating lens 36 are symmetrical to the angle at which the light is emitted from the collimating lens 35 and the position where the light enters the collimating lens 35, with the result that the position where the light enters the left eye of the user is the position displaced −ΔX along the X axis, that is, the position of the pupil of the left eye EL2 which is moved. This relationship is the same in the ray axes TL1 to TL5 or in any position therebetween.

In this embodiment, each focal distance f1 and f2 of the two collimating lenses 35 and 36 is equal to each other, and the distance from the center of the mirror 132 (position where the laser light is reflected) to the collimating lens 35 and the distance from the collimating lens 36 to the pupil are equal to the focal distances of the collimating lenses 35 and 36. Hence, the absolute values of the amounts of movement on the left eye side in the X axis direction and in the Y axis direction are equal to the absolute values of the amounts of movement of the optical engine 100 in the X axis direction and in the Y axis direction (directions are opposite). Each focal distance f1 and f2 of the two collimating lenses 35 and 36 does not necessarily need to be equal to each other, each focal distance f1 and f2 of the collimating lenses 35 and 36 may be made to differ from each other and thus the amounts (absolute values) of movement of the optical engine 100 corresponding to the amounts of movement of the positions of the pupil may be made to differ from each other. Both the amounts of movement (absolute values) have a proportional relationship which is determined by the image formation magnification of the relay optical path 31.

Although the description has been given above using the left eye EL as an example, the optical modules 41 and 42 are provided symmetrically, for the right eye ER, likewise, changes in the positions of the right eye ER in the X axis direction and in the Y axis direction are detected with the eye camera 27 and thus the positions of the optical engine 100 provided within the optical module 42 in the X axis direction and in the Y axis direction are changed such that the positions of the pupil are followed.

In the retinal scanning display device 20 described above, images for the left eye EL and the right eye ER output from the image output device 60 are changed into the outputs of the laser light with the optical modules 41 and 42, the outputs are applied to the centers of the pupils of the left eye EL and the right eye ER, the laser light is scanned on the pupils and thus images are formed. Here, the retinal scanning display device 20 temporarily aligns the optical axes of the laser light from the optical modules 41 and 42 to the centers of the pupils, thereafter the positions of the centers of the pupils are detected with the eye cameras 26 and 27 and thus the positions of the optical engines 100 within the optical modules 41 and 42 are moved in the X axis direction and in the Y axis direction by the amounts of displacement of the pupils in the X axis direction and in the Y axis direction. In the optical engines 100 within the optical modules 41 and 42, the three semiconductor lasers 111 to 113 for emitting light in the three primary colors, the planar optical multiplexer 120 and furthermore the mirror unit 130 are integrally configured, and the entire optical engine 100 is configured to be able to be displaced within a plane perpendicular to the optical axis in the X axis direction and in the Y axis direction. Hence, it is possible to easily perform control for following the displacements of the positions of the pupil and thereby keeping the focus of the laser light on the center of the pupil. Therefore, a simple configuration may be adopted in which signals from the eye cameras 26 and 27 are directly processed with the movement control unit 90 to move the optical engine 100. For example, if it is assumed that only the mirror unit 130 is moved to perform regulation, it is necessary to perform control for following the positions of the pupil while locating the mirror unit 130 with respect to the output axis of the planar optical multiplexer 120 for coaxially combining the laser light in the three primary colors to output the combined laser light, with the result that the alignment and the control are complicated. In the retinal scanning display device 20 of the present embodiment, it is possible to realize the control for following changes in the positions of the pupils with the extremely simple configuration. Therefore, it is possible to sufficiently enhance the responsivity thereof.

In the present embodiment, in order to combine the light in the three primary colors from the semiconductor lasers into one axis, the solid configuration using the waveguides is adopted. Hence, in order to align the optical axes of the laser light, it is not necessary to perform regulation such as the alignment of the optical axes of a dichroic mirror and a prism, and thus it is possible to reduce the size of the entire configuration and to realize high efficiency. Consequently, it is possible to reduce the size and the weight of a configuration ranging from the semiconductor lasers 111 to 113 to the mirror unit 130. Therefore, the entire optical engine 100 on which these components are mounted is able to be integrally moved in the X axis direction and in the Y axis direction.

In the embodiment described above, as the first and second movement units 140 and 150, piezoelectric actuators are used, and the responsivity thereof is extremely high. When the pupil is displaced 1 millimeter, in order for the optical engine 100 to follow this displacement, the responsivity of 0.1 seconds or less is realized. Instead of the piezoelectric actuators, for example, a mechanism for converting the rotation of a motor to a linear movement using a pinion and a rack may be used. In this case, the response speed may be equal to or greater than 0.1 seconds. Since for the movements of the pupils, higher responsivity is required in a left/right direction (X axis direction) than in an up/down. direction (Y axis direction), the side of the first movement unit 140 may be configured as a unit capable of moving at high speed with a piezoelectric actuator. A configuration may be adopted in which a movement unit using a motor is used to realize a large movement even at low speed and a movement unit using a piezoelectric actuator is further used.

Furthermore, in the present embodiment, as the optical system for guiding the light from the optical modules 41 and 42 to the pupils, the relay optical paths 31 and 32 using the two collimating lenses (one is the reflector) are used. Hence, a point where an optical image in the optical engine 100 is formed, that is, a laser emission point on the mirror 132 is able to be made to easily correspond to the amount of displacement of the center of the pupil, and thus it is possible to significantly simplify the following control. Although in the embodiment described above, the relay optical paths described above are formed with the two convex lenses, that is, the collimating lenses here, the relay optical paths may be formed with one lens or may be realized singly with a hologram, a diffractive optical element, a free-form curve mirror, an optical waveguide plate or the like or by a combination thereof.

Figure 9:
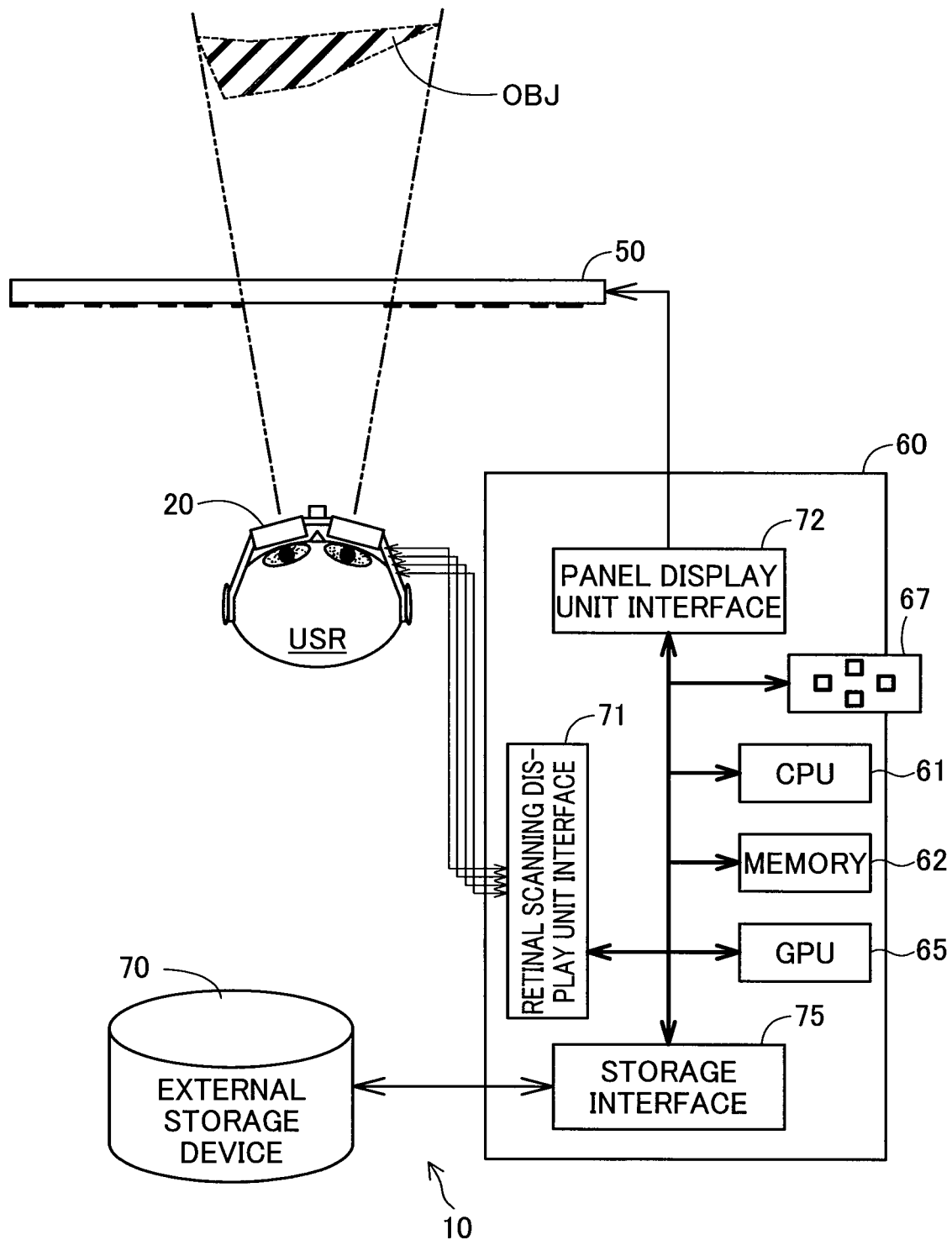
FIG. 9 is a schematic configuration view showing an image display system according to a first embodiment.

B. Image Display System using Retinal Scanning Display Device 20•First Embodiment (1) System Configuration:

An image display system using the retinal scanning display device 20 described above will then be described. The image display system 10 of the first embodiment includes, as shown in FIG. 9, the retinal scanning display device 20 described above which is fitted to the head of the user USR, the panel display device 50, the image output device 60 which outputs image data that needs to be displayed in the retinal scanning display device 20 and the panel display device 50 and an external storage device 70 which stores virtual space data serving as original data that is processed for display by the image output device 60.

The image output device 60 includes a CPU 61 which manages control, a memory 62, a GPU 65 which is a dedicated chip for performing image processing, an operation unit 67, a retinal scanning display unit interface 71 which exchanges signals with the retinal scanning display device 20, a panel display unit interface 72 which exchanges signals with the panel display device 50, a storage interface 75 which exchanges signals with the external storage device 70 and the like. The image output device 60 not only functions as an image output unit but also performs, as will be described later, part of the function of a line-of-sight detection unit.

Although the operations and the like of the individual units will be described later, the overall image processing will be briefly described. The image display system 10 of this embodiment extracts data of a space specified by the user USR from the virtual space data stored in the external storage device 70 through the storage interface 75, and utilizes the image conversion ability of the GPU 65 to convert the data into an image seen from the user USR based on the position of and the direction of the line of sight of the user USR. The conversion of the image is performed in real time by the operation of the operation unit 67 performed by the user USR and by the direction of the line of sight of the user USR. The image output device 60 allocates the converted image to output part thereof to the retinal scanning display device 20 through the retinal scanning display unit interface 71 and to output the remaining part to the panel display device 50 through the panel display unit interface 72, and causes both the display devices 20 and 50 to display them. Since the image displayed on the panel display device 50 is the remaining part of the image displayed with the retinal scanning display device 20, both the images may be said to be complementary to each other.

The virtual space data stored in the external storage device 70 is data which expresses a virtual three-dimensional space, and is original data for image display. The virtual space data described above may be data based on a real terrain, a real city and the like or may be totally virtual data used in a game or the like. The virtual space data may include data indicating three-dimensional data and a coordinate relationship of a target present in the virtual space, data indicating the color, the texture and the like of the target and the like. The external storage device 70 may be incorporated in the image output device 60 or may be provided in another site connected through a network or the like. Although in the present embodiment, the virtual space data is previously prepared, the virtual space data may be generated in real time by provision of space modeling rules or the imaging data of a three-dimensional camera may be utilized.

With the assumption that the user USR is present within the virtual space described above, the image is generated and displayed with the image output device 60. The first position (default position) within the virtual space may be previously determined or may be specified with the operation unit 67 by the user USR. As will be described later, the direction of the line of sight of the user is detected with the retinal scanning display device 20. A change in the position of the user, that is, a change in the position such as moving forward or turning in the virtual space is not able to be provided to the image output device 60 only with the retinal scanning display device 20. Hence, the user USR operates the operation unit 67 to input a change in the position of the user USR. Preferably, for example, arrow keys which correspond to the forward/backward and left/right movements of the operation unit 67 are provided, a joystick is provided or a two-dimensional touch pad is provided to receive an input of the direction of movement produced by the user USR.

In the retinal scanning display device 20, the images are formed with the laser light emitted from the optical modules 41 and 42 in the central field of vision regions of the retinas of the left and right eyes EL and ER. The central field of vision region is a region which includes at least the fovea centralis of the retina of a person. The eye of a person has a high recognition ability in the central field of vision region. Hence, the images formed with the optical modules 41 and 42 are clearly recognized. Since the distance between both the eyes of the user USR and the like differ depending on the individual, when the retinal scanning display device 20 is fitted to the head of the user USR, the alignment of the optical system is adjusted such that the laser light reflected off the relay optical paths 31 and 32 reaches the central field of vision regions of the retinas. As has already been described, when the user moves the eyeballs to change the direction in which to see the images, and thus the positions of the pupils are changed, in the retinal scanning display device 20, the eye cameras 26 and 27 are used to detect this change, the optical engines 100 are displaced and the optical axes of the laser light are aligned to the centers of the pupils. As will be described later, parallax for a stereoscopic view is provided by the optical modules 41 and 42 to the images generated for the left and right eyes EL and ER, and thus the so-called focus of the eyes of the user USR is regulated to a position corresponding to the parallax in response to parallax information included in the left and right images. Hence, objects which are present in positions other than the position described above, for example, objects which are seen through the transparent display units 21 and 22, are not normally focused, and thus they are blurred. This point will also be described in detail later.

Figure 10:
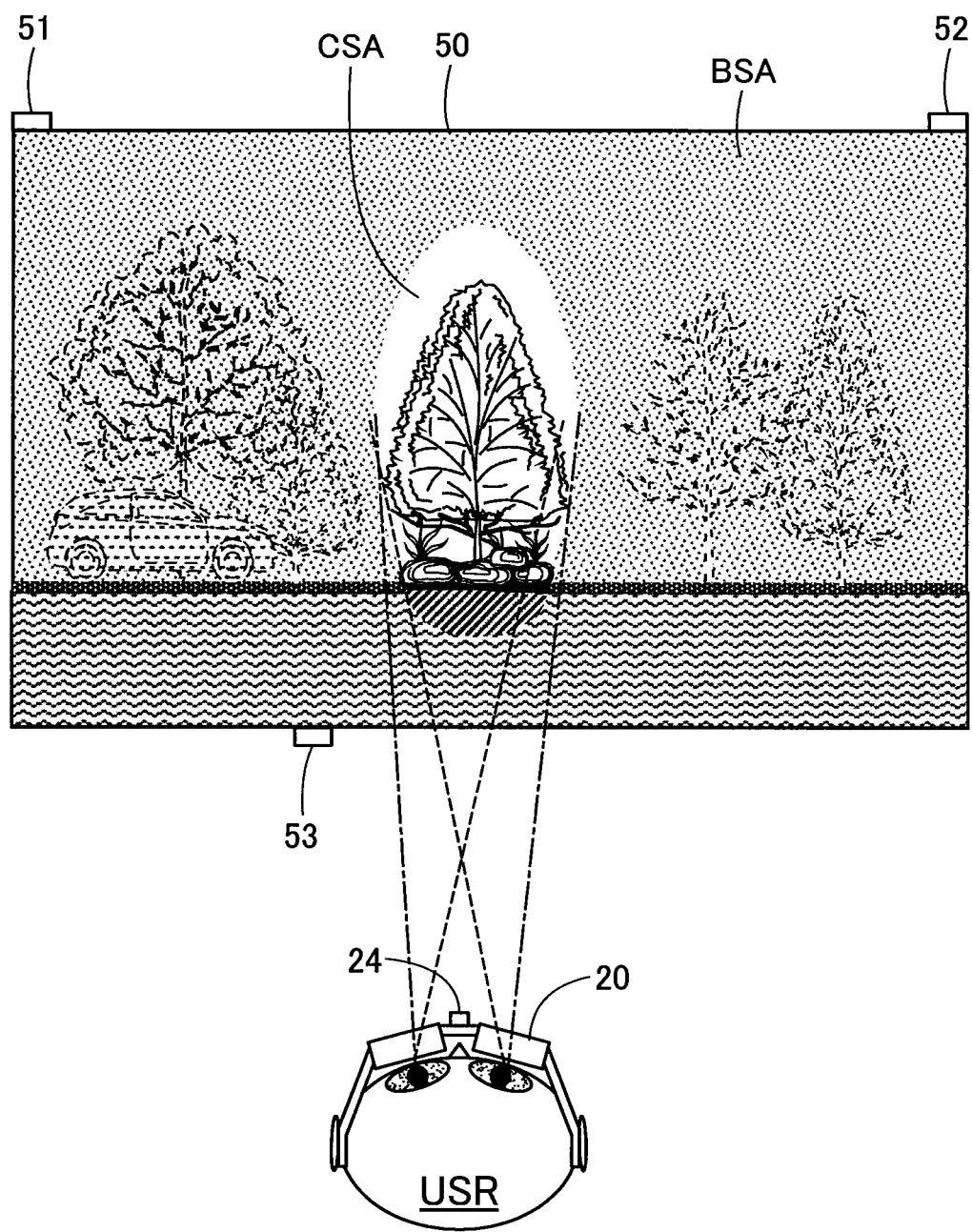
FIG. 10 is an illustrative view showing an example of an image which is seen from a user in the embodiment.

The video camera 24 is provided in order to recognize three markers 51 to 53 which are provided in the panel display device 50 placed in front of the user USR. As shown in FIG. 10, the markers 51 to 53 are provided in three parts of a frame which forms the outer edge of the panel display device 50. As long as the positions of the three markers satisfy conditions in which two or more markers are prevented from being present in the same position, the three markers are prevented from being aligned on one straight line and the three markers are in the imaging range of the video camera 24, the position relationship thereof is not limited. In the present embodiment, as shown in FIG. 10, the markers are individually provided in an upper left part, an upper right part and a lower left part of the panel display device 50.

The image output device 60 analyzes the positions of the markers 51 to 53 based on a picture from the video camera 24 so as to be able to identify the position relationship between the retinal scanning display device 20 and hence the user USR and the panel display device 50. In a case where a method of using the video camera 24 to image the markers 51 to 53 is adopted, when the positions of the markers 51 to 53 (the distances between the markers and the arrangement thereof) are known, the picture which is obtained by imaging with the video camera 24 and which includes the markers 51 to 53 is analyzed and thus it is possible to determine the position relationship between the retinal scanning display device 20 and the panel display device 50 (the distance to the panel display device 50 and the postures of the retinal scanning display device 20 in three directions with respect to the panel display device 50). Originally, when the parallax of images obtained by imaging with prepared two video cameras is utilized, it is possible to determine the position relationship between the retinal scanning display device 20 and the panel display device 50 without the position relationship of the markers 51 to 53 being previously found. The processing for determining the position relationship described above may be performed on the side of the retinal scanning display device 20. Instead of the video camera 24, a three-axis gyro sensor may be provided to detect the inclination of the head of the user USR and hence the inclination of the retinal scanning display device 20, and the result thereof may be output to the image output device 60. Preferably, since in this case, the distance between the panel display device 50 and the retinal scanning display device 20 is not determined, a default position is determined, and this is used as the initial value. The position relationship described above may be expressed in the Cartesian coordinate system of XYZ or may be expressed in a polar coordinate system in which any position of the head of the user USR is set to the origin point.

Figure 11:
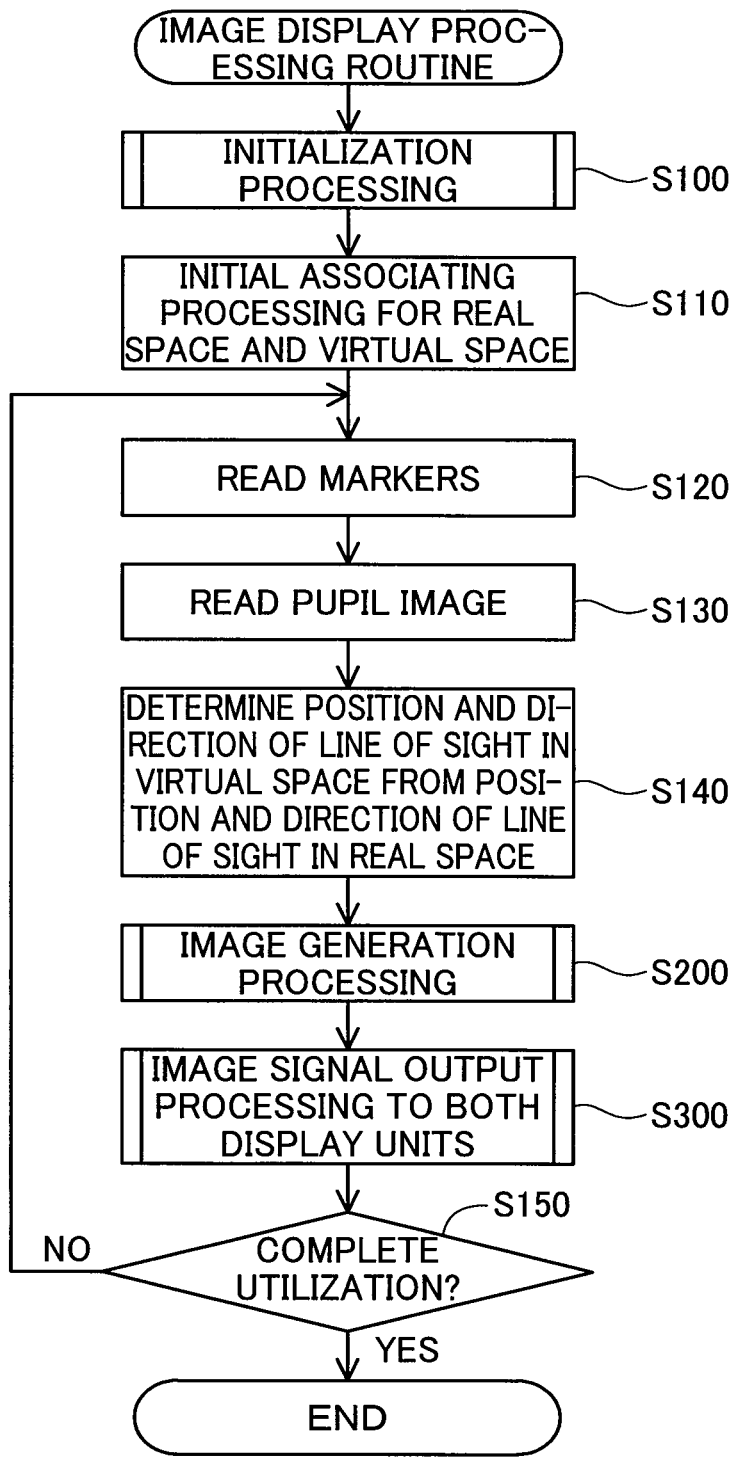
FIG. 11 is a flowchart showing an image display processing routine which is executed in an image output device.
Figure 12:
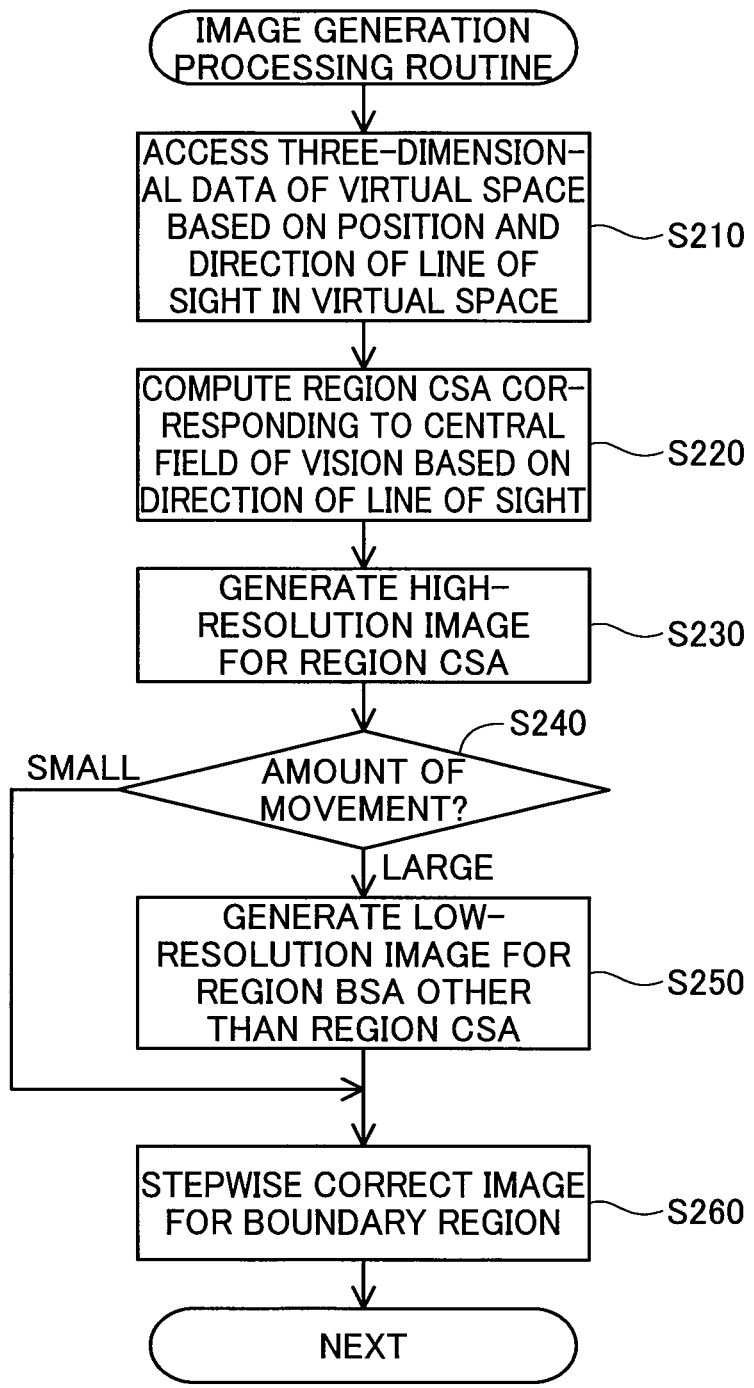
FIG. 12 is a flowchart showing an image generation processing routine which is executed in the image output device.

(2) Image Display Processing:

With the configuration described above, image display processing which is performed with the image display system 10 will be described with reference to FIGS. 10 to 12. FIG. 10 is an illustrative view showing an example of the image seen from the user USR in the present embodiment, and FIGS. 11 and 12 are flowcharts showing processing routines which are executed in the image output device 60. Before the description of the processing executed in the image output device 60, a description will be given of what kind of picture the user USR sees. The user USR who wears the retinal scanning display device 20 and who stands in front of the panel display device 50 sees an image which is displayed with the retinal scanning display device 20 and which serves as a first image and an image which is able to be recognized through the transparent display units 21 and 22 of the retinal scanning display device 20, which is displayed on the panel display device 50 and which serves as a second image. The image displayed with the retinal scanning display device 20 and the image displayed on the panel display device 50 are separately generated as will be described later.

Of the two images, the image displayed on the retinal scanning display unit 20 is, as shown in FIG. 10, the image of a region (hereinafter referred to as a central region) CSA corresponding to the central field of vision for the user USR. Since no image other than the image of the central region CSA corresponding to the central field of vision is output to the retinal scanning display device 20, no image is present in any region other than the central region CSA, and thus for the user USR, the regions other than the central region CSA are in a see-through state. An image in the region (hereinafter referred to as a peripheral region) BSA which is a region other than the central region CSA and which overlaps the display region of the panel display device 50 is output to the panel display device 50. Since the two images do not overlap each other, they are in a complementary relationship. Hence, the user USR visually recognizes the image of the central region CSA displayed on the retinal scanning display device 20 and the image of the peripheral region BSA displayed on the panel display device 50 as an image which is continuous and which is free of contradiction and overlap.

While the user USR is seeing the image, the video camera 24 provided in the retinal scanning display device 20 continuously performs imaging, that is, images the markers 51 to 53 illustrated in FIG. 10. Hence, the image output device 60 recognizes the markers 51 to 53 which are imaged so as to be able to find the position relationship between the user USR and the panel display device 50 with the panel display device 50 serving as the starting point of the coordinate system, that is, the distance and the inclination (the posture of the head of the user USR) of the retinal scanning display device 20. Moreover, the signals from the eye cameras 26 and 27 provided in the retinal scanning display device 20 are directly input to the optical modules 41 and 42 and are also input to the image output device 60, and thus the image output device 60 is able to find, from the images of the pupils of the left and right eyes EL and ER of the user USR, the positions of the pupils and the direction of the line of sight with the head of the user USR serving as the starting point of the coordinate system. Hence, the image output device 60 utilizes both the recognition results so as to be able to find in what posture the user USR is in with respect to the panel display device 50 and in which direction the user USR is looking. Although in the present embodiment, the line-of-sight detection unit detects the direction of the line of sight from the images of the pupils obtained by imaging with the eye cameras 26 and 27, the positions of the pupils may be directly detected with dedicated sensors or the like, and thus the direction of the line of sight may be determined by calculation.

An image display processing routine and an image generation processing routine which are executed with the image output device 60 will then be described. When the power is turned on, and the user USR wears the retinal scanning display device 20, the image output device 60 of the image display system 10 executes the image display processing routine shown in FIG. 11. When this processing routine is started, the CPU 61 of the image output device 60 first executes initialization processing (step S100). Initialization processing refers to, for example, initialization processing necessary for securing a memory space used in the image processing, the settings of the GPU 65 and the exchange of signals and data with the retinal scanning display device 20, the panel display device 50 and the external storage device 70. It is assumed that the alignment of the optical system of the retinal scanning display device 20 fitted to the head of the user USR has been performed and that the images resulting from the retinal scanning are formed in the appropriate positions of the eyes of the user USR.

After the completion of the initialization processing, the CPU 61 executes processing which initially associates a real space with the virtual space (step S110). In this processing, the part of the virtual space in which the user USR is located and the direction in which the user USR faces are set, and the real space in which the user USR is present while wearing the retinal scanning display device 20 and the virtual space which is stored in the external storage device 70 are associated with each other. The part of the virtual space in which the user USR is located and the direction in which the user USR faces may be previously determined as a default position and a default direction or may be set by the user USR with the operation unit 67. In such a case, an initial position and an initial direction are previously provided, and then the operation unit 67 is operated to perform the association. In the first place, when the user USR starts the use of the image display system 10, the position and direction within the virtual space are specified, for example, in a form such as "The user USR stands at xx place in 00 world to face east", and thus the position and the direction may be associated with the real space of the user USR. The position and the direction may be specified by utilization of, for example, voice recognition, or may be specified by being displayed on a map or the like and specifying a point on the map and a direction.

Then, the image output device 60 performs processing which exchanges signals with the retinal scanning display device 20 and which reads the markers 51 to 53 provided in the panel display device 50 from the picture obtained by imaging with the video camera 24 of the retinal scanning display device 20 (step S120). Furthermore, the image output device 60 performs processing which inputs signals from the eye cameras 26 and 27 of the retinal scanning display device 20 and which reads the images of the pupils (step S130). The image output device 60 is able to find, from these two pictures, the position of the user in the real space and the direction of the line of sight, that is, how far away the user is with respect to the panel display device 50 and which part of the panel display device 50 the user sees, and thus the image output device 60 is able to determine from which position and in which direction the user USR is looking in the virtual space associated (step S140).

Based on the association described above, the image output device 60 then performs image generation processing (step S200) and processing which outputs the image signals to both the display devices 20 and 50 (step S300). Thereafter, whether or not the utilization of the image display system 10 by the user USR is completed is determined (step S150), and when the use is not completed, the process returns to step S120, and the process is repeated from the reading of the markers 51 to 53. Hence, when the user USR changes the position with respect to the panel display device 50 or changes the direction in which the user USR is looking, for example, processing is continued which changes the size of the image according to the change of the position with respect to the panel display device 50 such as moving close thereto or moving away therefrom. It is possible to easily realize the start and the completion of the use of the image display system 10 with a switch provided in the operation unit 67 or the like.

The image generation processing (step S200) in FIG. 11 will be described with reference to FIG. 12. When the image generation processing routine is started, the CPU 61 first performs processing which accesses, based on the current position of the user USR in the virtual space and the direction of the line of sight, the three-dimensional data of the virtual space stored in the external storage device 70 so as to read it (step S210). Then, based on the three-dimensional data which is read and the current direction of the line of sight of the user USR, the central region CSA corresponding to the central field of vision of the user USR is computed (step S220). The computation of the central region CSA corresponds to the determination of the center position of the central region CSA and the size thereof. With respect to the size, in the present embodiment, the shape of a predetermined ellipse or oval is defined, and the size is defined as, for example, a minor radius and a major radius.

Thereafter, for the determined central region CSA, the CPU 61 instructs the GPU 65 to generate a high-resolution image (step S230). Since the position of the user USR in the virtual space and the direction of the line of sight are determined in step S130 of FIG. 11, it is easy to generate an image corresponding to the central region CSA in accordance with this determination. Here, the GPU 65 converts, based on the three-dimensional data of the virtual space, a three-dimensional depth within the virtual space into the parallax of the images formed on both the eyes EL and ER, and separately generates the images for both the eyes EL and ER. The resolutions of the generated images are set by providing, to the GPU 65, parameters when the three-dimensional data serving as the source of the images is subjected to rendering. Since the central region CSA is narrower than the peripheral region BSA around the central region CSA, the GPU 65 is able to generate high-resolution images for both the eyes corresponding to the central region CSA for a short period of time. The images are rewritten at a rate of about 60 frames per second, and thus the user USR is assumed to see pictures (moving images). The method of rewriting the images may be interlaced or non-interlaced.

Then, the CPU 61 determines whether the amount of movement of the line of sight of the user USR is large or small (step S240). The amount of movement of the line of sight is able to be grasped as an amount θ of variation of the angle of the line of sight from a direction when the high-resolution image is generated immediately before. In a case where the angle θ is large (including a case where the image is generated for the first time), processing which generates a low-resolution image is performed on the peripheral region BSA other than the central region CSA (step S250). Furthermore, processing which corrects the image stepwise is performed on a boundary region between the central region CSA and the peripheral region BSA (step S260). Specifically, it is possible to realize this processing by gradually lowering the resolution of the periphery of the central region CSA toward the outside. As for the processing which lowers the resolution, various types of methods such as the nearest neighbor method, the bilinear method and the high cubic method are known. Any one of these methods is preferably applied. Simply stated, the gradation values of two or more pixels adjacent to each other are preferably replaced by the average gradation value of the pixels.

On the other hand, when the amount of movement of the line of sight is determined to be small (step S240), an image is not newly generated in the peripheral region BSA, and only the correction of the resolution of the boundary region is performed (step S260). In either of the cases, the present processing routine is completed.

As described above, the generation of the high-resolution image in the central region CSA (step S230) and the generation of the low-resolution image in the peripheral region BSA (step S250) are performed, and thereafter the processing in step S300 shown in FIG. 11, that is, the processing which outputs the image signals to the retinal scanning display device 20 and the panel display device 50 is performed. Hence, as shown in FIG. 10, in the central region CSA, the user USR is able to visually recognize the high-resolution image displayed with the retinal scanning display device 20. Moreover, here, in the images generated on the retinas of the left and right eyes, parallax corresponding to the depth is provided, and thus the user USR three-dimensionally recognizes, in the central region CSA, an image with a depth, that is, the virtual space.

Figure 13:
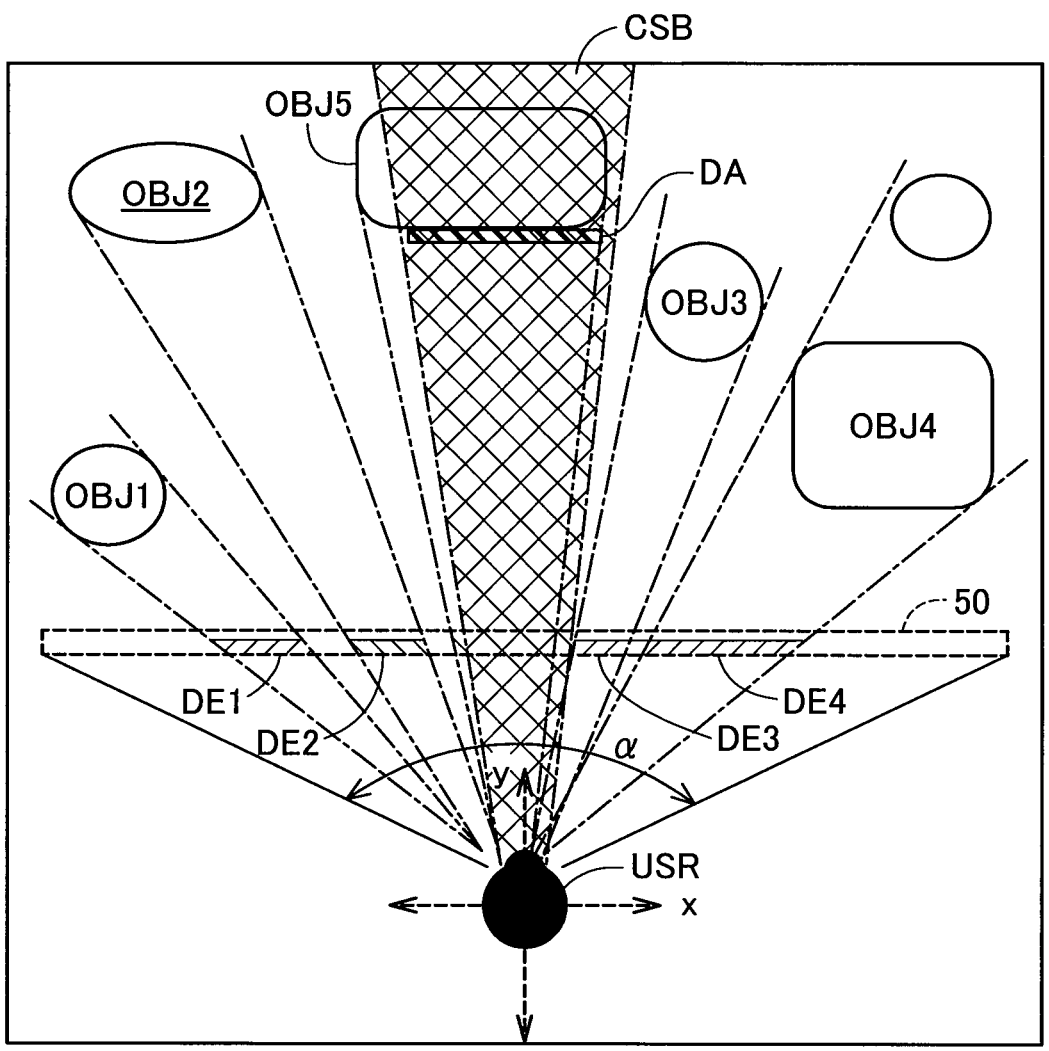
FIG. 13 is an illustrative view schematically showing how the image is seen from the user.

This state is illustrated in FIG. 13. It is now assumed that in the virtual three-dimensional space, objects OBJ1 to OBJ5 are present. It is assumed that the user USR located slightly away from the panel display device 50 faces the object OBJ5 in the virtual space. Here, the image output device 60 recognizes the position of the user USR and the direction of the line of sight so as to display an image corresponding to the central region CSA on the retinal scanning display device 20. In FIG. 13, a range CSB which corresponds to the central region CSA and which is seen from the user USR is cross-hatched.

The image output device 60 assumes that the user USR sees the cross-hatched range CSB, generates an image when the range CSB is seen from the side of the user USR and displays this image with the retinal scanning display device 20. Since this image includes the parallax information, the user USR visually recognizes the image when the object OBJ5 is seen from the side of the user USR and visually recognizes the image due to the parallax included in the image such that the object OBJ5 is present in a position DA away from the user USR. Here, on the panel display device 50, as the image corresponding to the object OBJ5, an image other than the image in a left end which is not in the central region CSA is not formed.

On the panel display device 50, the image of the peripheral region BSA complementary to the central region CSA is formed. When it is assumed that the objects OBJ1 to OBJ4 are seen from the user USR, positions where images corresponding to these objects are formed are the positions DE1 to DE4 of the panel display device 50. When it is assumed that the panel display device 50 is, for example, a liquid crystal display device of 48 inches with an aspect ratio of 16 to 9, if the user USR stands in a place 50 centimeters away from the center of the panel display device 50, the user USR is able to see the image on the panel display device 50 in a range of a total of 94 degrees, that is, 47 degrees on the left side and 47 degrees on the right side in a horizontal direction. In FIG. 13, this range is indicated as an angle α. Likewise, the user USR is able to see the image on the panel display device 50 in a range of a total of 62 degrees, that is, 31 degrees on each of the upper and lower sides in a vertical direction. The user USR is able to visually recognize the image on the panel display device 50 through the transparent display units 21 and 22 of the retinal scanning display device 20. Although this image is displayed on the panel display device 50 so as to be a low-resolution image without depth, since the user USR focuses attention on the direction of the line of sight, when the image is in a range of about the angle α, the sense of immersion of the user USR is sufficiently high.

The left and right eyes EL and ER of the user USR are focused on places corresponding to the depth of the virtual space according to the parallax information included in the images which are formed in the central field of vision of the retinas with the retinal scanning display device 20, and thus the image of the peripheral region BSA displayed on the panel display device 50 is not focused. In other words, the image of the peripheral region BSA is a blurred image for the user USR. In human visual recognition characteristics, the spatial resolution (visual acuity) of the field of view other than the central field of vision is rapidly lowered. Hence, even when the peripheral region BSA in which the image lower in resolution than the image of the central region CSA is displayed as described above is not focused, the user USR is unlikely to have an uncomfortable feeling especially for recognition. Moreover, the image in the periphery of the central region CSA is corrected such that the resolution is changed stepwise in the boundary region between the central region CSA and the peripheral region BSA, and thus the user USR is more unlikely to have an uncomfortable feeling for a difference between the images of the central region CSA and the peripheral region BSA.

When in this state, the user USR changes the direction in which the user USR is looking, the change of the direction of the line of sight is immediately recognized with the image output device 60 as changes in the positions of the markers 51 to 53 detected with the video camera 24 and changes in the movements of the eyes EL and ER detected with the eye cameras 26 and 27. Although the direction of the line of sight may simply be the direction in which the user USR is looking, it may also be considered that the position of a focal point from the positions of the pupils of the left and right eyes EL and ER, that is, how far is the point seen by the user USR is recognized. The position of the focal point is recognized, and thus it is possible to regulate, according to the position of the focal point which is recognized, the parallax of the images formed on the retinas of the left and right eyes EL and ER.

Figure 14:
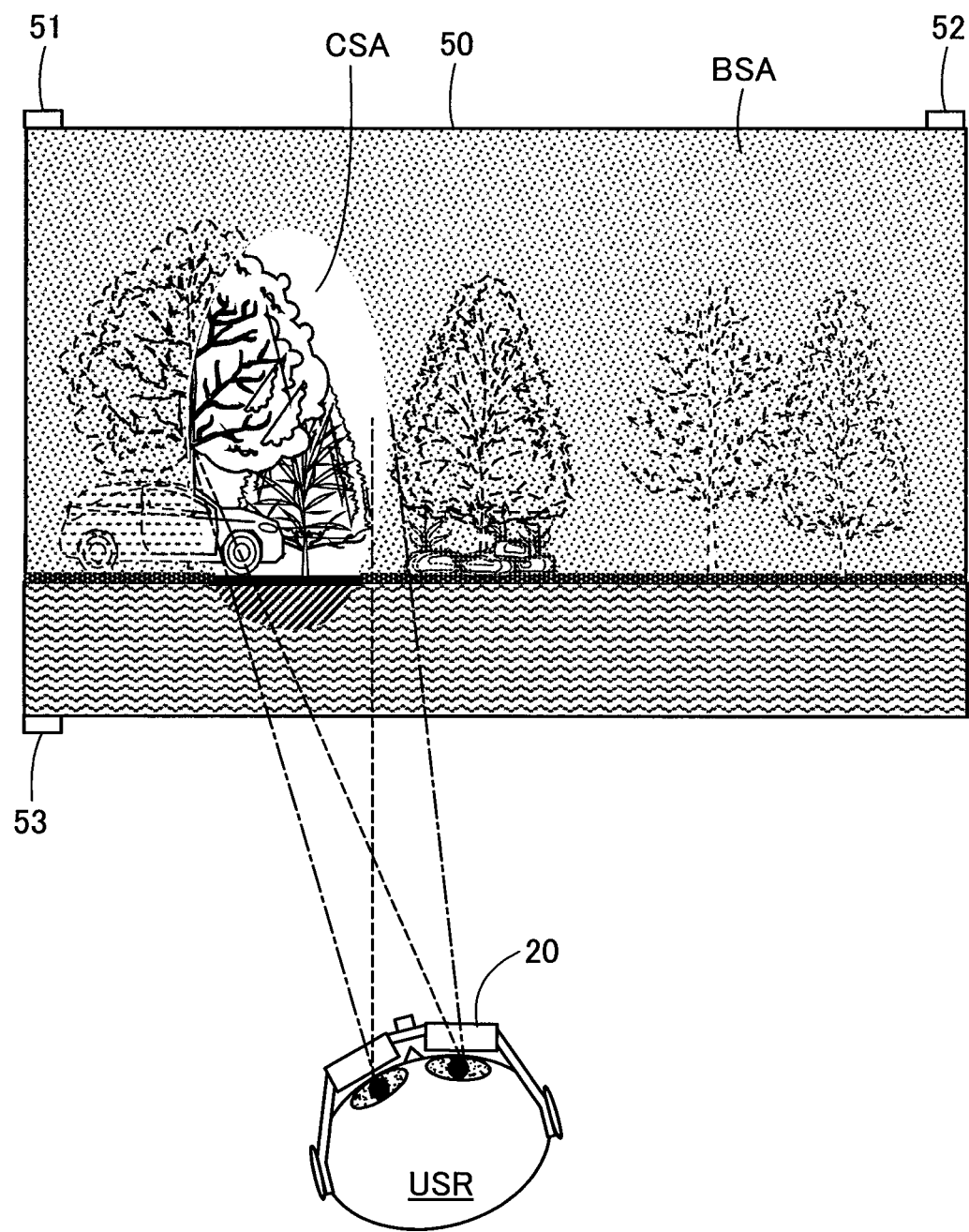
FIG. 14 is an illustrative view showing an example of an image which is seen from the user when the direction of the line of sight of the user is moved.

When the direction in which the user USR is looking is found, as illustrated in FIG. 14, the image displayed in the central region CSA which is displayed on the retinal scanning display device 20 is moved in the direction in which the user USR is looking within the virtual space. The image displayed in the peripheral region BSA is formed, according to this movement, as the image complementary to the image of the central region CSA. When the central region CSA is moved, the image formed in the central region CSA is constantly a high-resolution image, and the image formed in the peripheral region BSA is constantly a low-resolution image.

As described above, in the image display system 10 of the embodiment described above, the retinal scanning display device 20 displays, in the central region CSA in the direction of the line of sight of the user USR, an image which has a high resolution and which is stereoscopically viewed, and the panel display device 50 displays, in the peripheral region BSA complementary to the central region CSA, an image which has a low resolution. The central region CSA is set to follow the direction of the line of sight of the user USR, and the image in the region is updated to follow this. Hence, the resolution of the image formed in the central field of vision of the user USR is constantly kept high, and thus the user USR is able to continue to see clear images in the virtual space, is not concerned about distortion and discontinuous parts over the wide field of view and is able to experience a natural stereoscopic view. Consequently, the user USR is able to continuously experience a high sense of immersion in the virtual space and to feel great realism.

Moreover, in this example, even when the positions of the pupils of the user USR are changed, in the retinal scanning display device 20, the optical alignment is immediately corrected, and thus the laser light follows so as to constantly pass through the centers of the pupils, with the result that the images on the retinas are prevented from being displaced. Hence, the parallax of both the eyes and the like are properly kept, and thus the inhibition of the sense of immersion of the user USR is reduced.

In the image display system 10 of the present embodiment, a large part of the field of view of the user USR is covered with the image displayed on the retinal scanning display device 20 and the image displayed on the panel display device 50, and moreover, when the image which is visually recognized by the user USR with the retinal scanning display device 20 is changed according to the change of the direction of the line of sight of the user USR, the complementary image displayed with the panel display device 50 is also changed. Hence, the uncomfortable feeling is suppressed which occurs between the image that is directly displayed on the retinas of the user with the retinal scanning display device 20 and the image that is seen by the user and that is displayed on the panel display device 50. With the retinal scanning display device 20 and the panel display device 50, it is also possible to provide a large amount of information or complicated information.

Moreover, an image visual recognition distance for the user USR is determined by the image of the central region CSA displayed with the retinal scanning display device 20, and thus it is not necessary to increase the distance between the panel display device 50 and the user USR. The image displayed with the panel display device 50 constantly serves as the image of the peripheral region BSA for the user USR, and even when the distance to the panel display device 50 is short, and the image displayed on the panel display device 50 is not focused, the sense of immersion is not prevented. Hence, it is sufficient that the distance from the user USR to the panel display device 50 is several tens of centimeters, and thus it is possible to reduce the size of the overall configuration including the panel display device 50.

Furthermore, since the image displayed on the retinal scanning display device 20 is able to be set to only the image of the central region CSA, as compared with a case where all the images including the peripheral region BSA are formed, it is possible to reduce the time necessary for the generation of the image in the image output device 60 which has a high resolution and which includes the parallax information. The display region of the retinal scanning display device 20 itself is able to be decreased in size according to the central region CSA, and thus it is possible to reduce the sizes of the optical modules 41 and 42, the relay optical paths 31 and 32 and the like in the retinal scanning display device 20. Consequently, it is possible to, for example, save resources and reduce manufacturing costs.

The image which is displayed in the peripheral region BSA with the panel display device 50 is complementary to the image displayed in the central region CSA and has a low resolution. Hence, it is possible to reduce the time necessary for the computation of the image of a wide region. Moreover, here, as shown in FIG. 12, when the amount of movement of the line of sight is not large, the update processing of the image is not performed on the peripheral region BSA. Hence, it is possible to further reduce computation processing. When the amount of movement of the line of sight is small, since the change in the image of the peripheral region BSA is small, and the visual recognition ability of a person in a region other than the center is low, the user USR is prevented from having an uncomfortable feeling even without the update being performed.

Since the retinal scanning display device 20 used in the image display system 10 of the present embodiment is a see-through type, the user USR sees the image displayed on the panel display device 50 through the transparent display units 21 and 22 of the retinal scanning display device 20. Hence, while the user USR is able to be immersed in the world of the picture displayed with the image display system 10, the visual recognition of the peripheral real world including the body of the user USR is substantially prevented from being inhibited or is completely prevented from being inhibited. It is possible to have a natural visual experience, and moreover, for example, when an emergency or the like occurs, and thus a person who is trying to notify the user USR of something enters the field of view, it is easy to visually recognize this through the retinal scanning display device 20.

C. Second Embodiment

Figure 15:
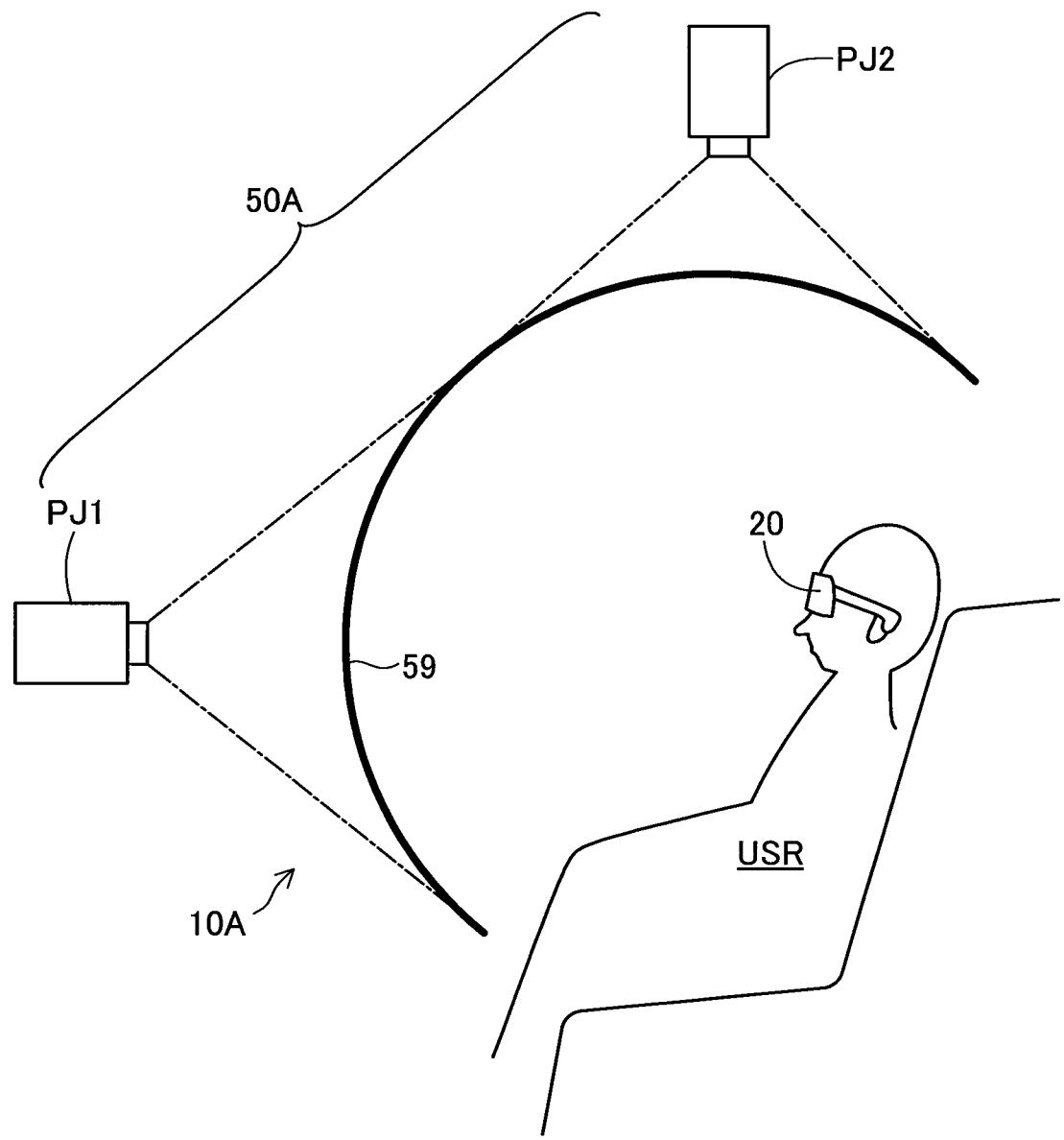
FIG. 15 is an illustrative view illustrating a second embodiment.

In the first embodiment, a liquid crystal display having a flat display surface was used as the panel display unit. On the other hand, as shown in FIG. 8, the image display device 10A of the second embodiment includes the same retinal scanning display unit 20 as used in the first embodiment and a panel display unit 50A which has a curved display surface. Although as the curved display described above, for example, a display such as an organic EL display which is able to form a flexible light emission surface may be utilized so as to achieve the curved display, in the second embodiment, a projection display device is used. In the second embodiment shown in FIG. 15, the user USR wears the retinal scanning display unit 20 and is located within the dome-shaped panel display unit 50A. In this embodiment, the basic configuration of the image display device 10 is the same as in the embodiment described above, and an image output device which outputs image data that should be displayed on the retinal scanning display unit 20 and the panel display unit 50A, and an external storage device which stores virtual space data that is source data to be processed with the image output device for display, are provided. The retinal scanning display unit 20 remains the same. The panel display unit 50A differs in that the panel display unit 50A is a projection type and that the display surface is dome-shaped.

The panel display unit 50A includes a plurality of projection display devices PJ1, PJ2, . . . , and projects, from the outside of a dome 59, the image output from the image output device 60. The dome 59 is a rear projection screen, and the user USR is able to see the image projected with the projection display device PJ1 and the like.

Even in the second embodiment, in the central region CSA including the central vision of the user USR, high-resolution images for stereoscopic view are formed with the retinal scanning display unit 20 on the retinas of the left and right eyes EL and ER of the user USR, and a low-resolution image is formed with the panel display unit 50A in the region (peripheral region BSA) complementary to the central region. Hence, the same effects as in the first embodiment are achieved, and moreover, the dome 59 is used, and thus it is possible to display the image so as to cover a region close to the full field of view of the user USR, with the result that it is possible to enhance the sense of immersion of the user USR. Moreover, since the image visual recognition distance for the user USR is determined by the image of the central region CSA displayed with the retinal scanning display unit 20, it is not necessary to increase the distance between the dome 59 and the user USR. The image displayed on the dome 59 with the panel display unit 50A constantly serves as the image of the peripheral region BSA for the user USR, and even when the distance to the dome 59 is short, and the image is not focused, the sense of immersion is not prevented. Hence, it is sufficient that the distance from the user USR to the dome 59 is several tens of centimeters. The size of the dome 59 is reduced as described above, and thus it is possible to reduce the number of projection display devices PJ1, PJ2, . . . which are installed, and to control display abilities such as display brightness and the like, with the result that it is possible to achieve the simplification and decrease in size of the device as a whole, including these points.

D. Third Embodiment

Figure 16:
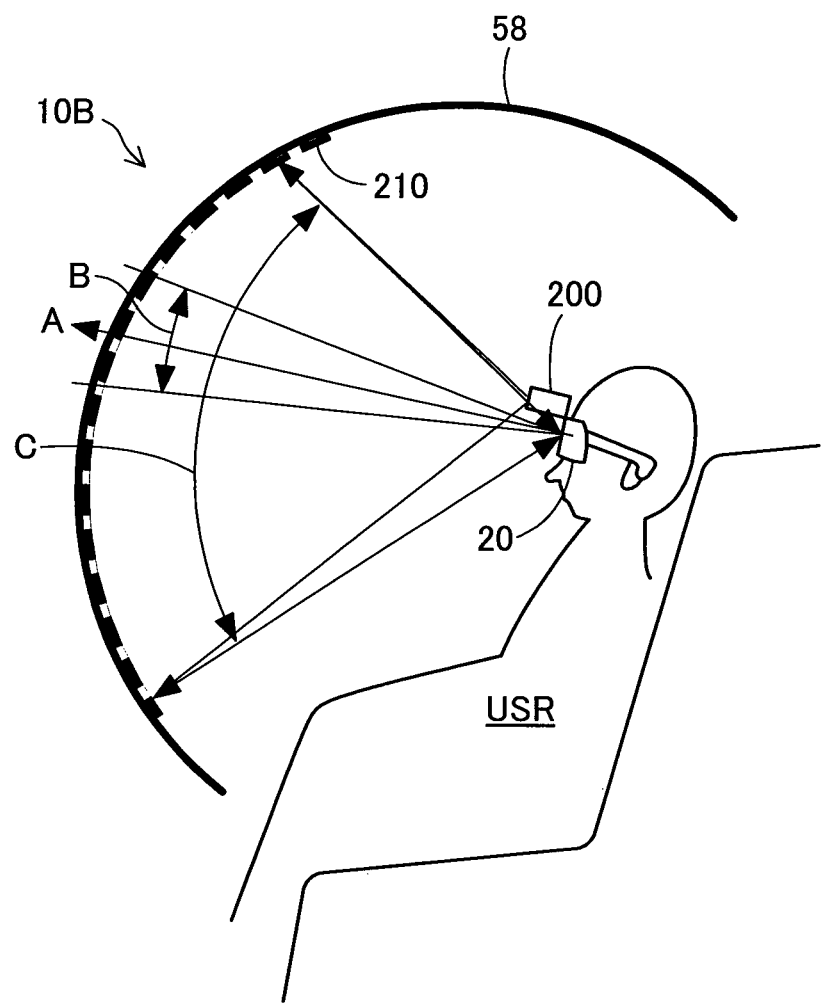
FIG. 16 is an illustrative view illustrating a third embodiment.

The third embodiment will now be described. FIG. 16 is an illustrative view showing a schematic configuration of the image display device 10B of the third embodiment. As shown in FIG. 16, the image display device 10B includes the retinal scanning display unit 20 fitted to the head of the user USR and a panel display unit 50B. The third embodiment is the same as in the first and second embodiments in that the image output device which outputs image data that should be displayed on the retinal scanning display unit 20 and the panel display unit 50B, and the external storage device which stores virtual space data that is source data to be processed with the image output device for display, are provided.

The panel display unit 50B is configured with a projector 100 which is provided together on the head of the user USR with the retinal scanning display unit 20 and a retroreflective screen 110 which is stuck to the inner side of a spherical dome 58. The retroreflective screen 110 is a screen in which small glass beads are spread on its surface. In the glass beads, the refractive index and the diameter thereof are selected so as to produce retroreflection. As the retroreflective member using the glass beads described above, various types are known which include an exposed lens type, an enclosed lens type, a capsule lens type, and the like. In the present embodiment, since the screen is stuck to the inner side of the dome 58, a retroreflective member which is highly flexible, and which is the exposed lens type, is used. In the first place, when the retroreflective member is manufactured together with the dome 58, the retroreflective member is not limited to the exposed lens type, and it is possible to use the enclosed lens type or the capsule lens type. Alternatively, a prism type retroreflective member may be used.

The image which is displayed with the retinal scanning display unit 20 is the first image, and is, as described previously, the image of the central region CSA (see FIG. 10) corresponding to the central vision for the user USR. This image is constantly displayed in the direction A of the line of sight of the user USR. In FIG. 16, the display range thereof is indicated as a range B. In the first place, the range B is a three-dimensional range. Since an image other than the image of the central region CSA corresponding to the central vision is not output to the retinal scanning display unit 20, no image is present in the region other than the central region CSA, and thus for the user USR, the regions other than the central region CSA are in a see-through state. In the regions other than the central region CSA, the image which is projected from the projector 100 and which serves as the second image is reflected off the retroreflective screen 110 so as to enter the field of view of the user USR. In other words, the image of the peripheral region BSA is the image which is projected from the projector 100. In FIG. 16, the range of the image projected from the projector 100 is indicated as range C. The image displayed with the retinal scanning display unit 20 and the image displayed with the projector 100 do not overlap each other, so as to be complementary to each other. Hence, the user USR visually recognizes the image of the central region CSA displayed on the retinal scanning display unit 20 and the image of the peripheral region BSA which is projected from the projector 100, which is reflected off the retroreflective screen 110 and which is visually recognized, as an image that is continuous and that is free of contradiction and overlap.

Since the image display device 10B of the third embodiment uses the retroreflective screen 110 as the panel display unit 50B, a large part of light projected from the projector 100 is returned to around the head of the user USR. Hence, even a projector which produces a low output is able to serve as the panel display unit 50B so as to form a second image having sufficient brightness. Furthermore, since the projector 100 which projects the image on the retroreflective screen 110 is provided on the head of the user USR, even when the position of the head of the user USR is moved, the reflected light is efficiently collected around the head of the user USR. Hence, even when the user USR moves, it is not necessary to correct the alignment and the like.

In the third embodiment, both the retinal scanning display unit 20 and the projector 100 for the panel display unit 50B which display the images are provided together on the head of the user USR, and thus it is possible to simplify the management of the connection, information transfer and wiring of power lines, etc., to the image output device 60 and the like. On the side of the dome 58, only the retroreflective screen 110 is preferably installed, and thus it is easy to move and install the dome 58. Both the retinal scanning display unit 20 and the projector 100 are provided together on the head of the user USR, and thus it is easy to align the arrangements of the first image and the second image. If the retroreflective screen 110 is installed on the entire surface on the inner side of the dome 58 or almost the entire surface, the user USR is able to visually recognize the first and second images from the ceiling to their feet, that is, substantially over 360 degrees. When visual recognition over 360 degrees is achieved, it is possible to reduce the number of projectors 100, and depending on conditions, with only one projector 100, it is possible to achieve visual recognition over 360 degrees.

Instead of one projector 100, a plurality of projectors 100 may be arranged so as to extend the range C in which the second image is displayed. In this case, the retroreflective screen 110 within the dome 58 is preferably stuck to the interior of the dome 58 according to the extended range. The projector 100 may be integrally provided with the retinal scanning display unit 20 or may be provided separately to the retinal scanning display unit 20 with prosthetics such as a hat-shaped adapter or belt on the head of the user USR. When the projector 100 is provided close to the head, the projector 100 may be mounted on the shoulder. When the size of the projector 100 is reduced, the projector 100 may be arranged in the center of the retinal scanning display unit 20, and, for example, may be arranged side by side with the video camera 24 described in the first embodiment. The projector 100 may be incorporated in the temple 28 or 29.

In the first place, the projector 100 may be placed away from the user USR. In this case, a mechanism is preferably provided in which the movement of the head of the user USR is detected with a video camera or the like, and in which the direction of projection of the image from the projector 100 is three-dimensionally controlled according to the movement of the head. In this case, the projector 100 may directly project the second image toward the retroreflective screen 110 or may project the second image toward a convex mirror provided on the head of the user USR. In the latter case, the image which is reflected off the convex minor is further projected toward the retroreflective screen 110. In this way, it is possible to sufficiently utilize the property of the retroreflective screen 110 in which the light is reflected in the direction of projection, and to reduce the weight of the member mounted on the head of the user USR.

Furthermore, in the third embodiment, the first image which is visually recognized by the user USR is formed with the retinal scanning display unit 20, the second image is projected with the projector 100 which is prepared for each of users USR and is reflected off the retroreflective screen 110 and substantially all of the second image is returned to the vicinity of the head of the user USR, with the result that a plurality of users USR are also able to use one dome 58 at the same time. This is because, by the property of the retroreflective screen 110, an image projected from the projector 100 on the head of a user USR who is located slightly away is hardly visually recognized by a user USR who is adjacent to the user USR.

E. Other Embodiments

The image display system using the retinal scanning display device described above is also able to be realized in embodiments below.

[1] For example, as one embodiment, a retinal scanning display device is provided which includes an optical system that emits, to a pupil of a user, a plurality of types of laser light having different wavelengths in a range of visible light. The retinal scanning display device includes: a plurality of semiconductor lasers that respectively emit the types of laser light having different wavelengths; an optical multiplexer to which the semiconductor lasers are attached, which individually receives the types of laser light having different wavelengths emitted from the semiconductor lasers and which combines the types of laser light coaxially with a predetermined optical axis to output the combined laser light; a beam shaper that is provided on an output side of the optical multiplexer and that shapes the combined laser light output from the optical multiplexer into a light beam having a predetermined divergence or convergence angle; a direction-of-emission changer that changes, according to an image signal corresponding to an image to be formed, the direction of emission of the combined light beam output through the beam shaper within at least a plane intersecting the direction of emission; a detector that detects the position of the pupil of the user; and a regulator that integrally moves, according to the detected position of the pupil, an optical engine formed with the semiconductor lasers, the optical multiplexer and the direction-of-emission changer so as to guide the light beam emitted from the direction-of-emission changer to the position of the pupil of the user.

The light beam may be directly applied to the pupil of the user with the direction-of-emission changer or may be applied through a prepared relay optical system. In this case, for the light beam (including parallel light) having the predetermined divergence or convergence angle or less, a virtual image is formed in a position corresponding to the divergence angle of the light beam after passing through the relay optical system, and the user is able to visually recognize it. The predetermined divergence or convergence angle is preferably equal to or less than an angle in which the divergence angle of the light beam after passing through the relay optical system is a value corresponding to a virtual image distance. A procedure for determining the range of the divergence or convergence angle based on the virtual image distance and the configuration of the relay optical system is known. It is needles to say that the divergence or convergence angle described here includes an angle of 0 degrees, that is, parallel light.

[2] In the retinal scanning display device described above, the regulator may regulate, according to a displacement in the detected position of the pupil within a plane perpendicular to the optical axis, alignment within the plane perpendicular to the optical axis of the laser light output from the optical engine. In this way, even when the position of the pupil is two-dimensionally moved within the plane perpendicular to the optical axis of the laser light, the laser light is able to be easily applied to the pupil of the user. The regulation using the regulator may be performed on only alignment in one direction perpendicular to the optical axis. Since in general, the eyeballs of a person are often and easily moved in a lateral direction, the alignment in this direction is achieved, and thus it is possible to handle most of the movement of the eyeballs when the person gazes at a target.

The above-described regulator which performs the alignment in the optical engine is able to be easily configured with a piezoelectric actuator. In the first place, the regulator does not need to be limited to the piezoelectric actuator, a solenoid or the like may be used and it is easy to use, for example, a mechanism for converting the rotation movement of a motor or the like into a linear movement with a pinion and a rack.

[3] In the retinal scanning display device described above, the optical multiplexer may be a planar optical multiplexer. When the planar optical multiplexer is used, it is easy to reduce the size of the optical engine. The optical multiplexer does not need to be limited to the planar optical multiplexer, and a configuration using a prism, an interference film filter or a diffraction grating may be adopted as long as the configuration is able to be integrated with the optical engine.

[4] In the retinal scanning display device described above, the semiconductor lasers may respectively emit the types of laser light in red, green and blue. In this way, it is possible to display a color image using the three primary colors. In the first place, two types of laser light may be used or types of laser light having wavelengths other than red, green and blue may be combined together.

[5] In the retinal scanning display device described above, the optical multiplexer may include: a waveguide for the red, a waveguide for the green and a waveguide for the blue; a first directional coupler and a second directional coupler that propagate blue light from the waveguide for the blue to the waveguide for the green; and a third directional coupler that propagates, in the waveguide for the green, between the first directional coupler and the second directional coupler, red light from the waveguide for the red to the waveguide for the green. In this way, types of light in the three primary colors are able to be combined coaxially without use of a mirror and a prism, and thus it is possible to achieve a reduction in the size of the device and high reliability. The regulation of the alignment of the optical axis and the like is able to be omitted, and thus it is easy to perform manufacturing. In the first place, the optical multiplexer does not need to be limited to the configuration using the waveguides described above, and a structure using a dichroic mirror, a dichroic prism and the like may be adopted as long as the structure is able to be moved together with the optical engine.

[6] In the retinal scanning display device described above, the direction-of-emission changer may include a MEMS mirror. When the MEMS is used as the direction-of-emission changer, it is possible to reduce the size of the optical engine. It is also possible to change the direction of emission of the laser light at high speed. In the first place, the direction-of-emission changer does not need to be limited to the MEMS mirror, and a configuration using a piezoelectric actuator, a configuration using a small motor or the like is able to be adopted as long as the configuration is able to be moved together with the optical engine.

[7] In the retinal scanning display device described above, the beam shaper may be a collimating lens that is fixed on the output side of the optical multiplexer. As the beam shaper, the collimating lens is provided, and thus it is possible to easily suppress the divergence of the laser light which is output. In order for the divergence angle of the light beam applied to the pupil of the user to be a value corresponding to the virtual image presentation distance, the light beam output from the beam shaper preferably has the predetermined divergence or convergence angle. The beam shaper is not limited to the collimating lens, and a reflector or the like which has the same function may be used. Alternatively, the shape of the waveguide in the vicinity of the output end of the optical multiplexer is adjusted, and thus the laser light output from the waveguide to the outside may be formed into approximately parallel light or quasi parallel light without use of the collimating lens or the like. In this case, part of the waveguide functions as the beam shaper.

[8] It is possible to provide an image display system that displays a predetermined image for a user such that the user is able to visually recognize the predetermined image. The image display system includes: a head-mounted display device that incorporates the retinal scanning display device described above for both eyes and that scans, with the laser light, positions of retinas of the both eyes of the user so as to display a first image focused on a position a first distance apart from positions of the eyes of the user; a line-of-sight detection unit that detects the positions of the pupils of and the direction of a line of sight of the user who wears the head-mounted display device; a panel display device that displays a second image different from the first image on a panel provided in a position a second distance shorter than the first distance apart from the user; and an image output unit that outputs, to the head-mounted display device, the image signal for the first image serving as a part assumed from the predetermined image to be present in the detected direction of the line of sight of the user and that outputs, as the second image, to the panel display device, an image complementary to the first image for the predetermined image.

In the image display system described above, the predetermined image displayed for the user is the first image which is the part assumed to be present in the detected direction of the line of sight of the user and the second image complementary to the first image, the first image is displayed the first distance apart from the user with the retinal scanning display device and the second image is displayed on the panel display device provided in the position the second distance shorter than the first distance apart from the user. Hence, the user sees the first image focused on the position the first distance apart from the user in the line of sight, and simultaneously sees the second image complementary to the first image in the position the second distance shorter than the first distance apart. The eye of a person has a high recognition ability in the line of sight, that is, in the central field of vision region. Hence, the user is able to see the first image in the focus position as the clear image, and is able to see the predetermined image displayed in a wide range together with the second image complementary to the first image.

[9] In the image display system described above, the panel display device may have such a panel size that the angle of view seen by the user is equal to or more than 60 degrees and equal to or less than 180 degrees in a horizontal direction and is equal to or more than 40 degrees and equal to or less than 120 degrees in a vertical direction. In the angle range described above, the size of the panel display device is reduced, and it is possible to provide a sufficient sense of immersion to the user. The panel display device is not limited to a panel display device having a planar shape, and a configuration may be adopted in which a plurality of curved and planar panels are combined together to cover the angle of view of the user in the horizontal direction which is equal to or more than 180 degrees.

[10] In the image display system described above, in the image output unit, the first image displayed with the laser light on the eyes of the user in the head-mounted display device may be an image for a stereoscopic view that causes parallax in the eyes. In this case, the user uses the retinal scanning display unit to be able to have a stereoscopic view, and moreover, an image displayed on the panel display unit does not need to be an image for a stereoscopic view. Hence, it is possible to achieve both a request for the generation of an image for a stereoscopic view and a request for the display of a complementary image in a wide range. In the first place, the first image may be an image other than an image for a stereoscopic view.

[11] In the image display system described above, the panel display device may include: a screen in which a retroreflective member is installed on the surface of the panel; and a projector which projects the second image from near the head of the user toward the screen. In this way, the user is able to experience an image having a high sense of immersion. Since the screen uses the retroreflective member on the surface of the panel, the position of the projector is preferably near the user. In the first place, since the retroreflective member has a given width in the direction of reflection, the arrangement of the projector is not limited as long as the user is in the range described above.

[12] In the image display system described above, the image output unit may output the second image displayed on the panel display unit as an image in which at least one parameter of resolution, brightness, chroma and sharpness (a degree to which an image is not blurred) is lower than the parameter for the first image displayed on the retinal scanning display unit. In this way, it is possible to reduce the time necessary for the formation of the second image and the load of the processing.

[13] In the image display device described above, the image output unit may gradually change, in a boundary between the first image and the second image, the parameter from the side of the first image toward the side of the second image. In this way, the change of the image in the boundary between the first image and the second image is made smooth.

[14] The image display device described above may include: a storage unit which stores three-dimensional data that expresses a predetermined space; an operation unit which changes at least one of the position of and the direction of the line of sight of the user within the predetermined space; and an image generation unit which generates, from the three-dimensional data, as the predetermined image, a picture that is assumed to be visually recognized by the user in the predetermined space when at least one of the position of and the direction of the line of sight of the user is changed. In this way, the user is able to visually recognize the first image and the second image as if the user was seeing the objects within the predetermined space.

[15] Furthermore, the image display system described above may include: a storage unit which stores three-dimensional data that expresses an object group present in a predetermined virtual space; a coordinate system association setting unit which makes such a setting that a coordinate system of a real space where the user is present and a coordinate system of the predetermined virtual space are associated with each other; and an image generation unit which converts, according to the association of the coordinate systems that is set, the positions of the pupils and the direction of the line of sight that are detected into the positions of the pupils and the direction of the line of sight in the coordinate system of the virtual space, and which generates, from the three-dimensional data, as the predetermined image, a picture that is assumed to be visually recognized in the predetermined virtual space by the user in the virtual space. In this way, with the image display system, the user is able to visually recognize a picture which includes the object group present in the virtual space, and which is assumed to be visually recognized in the predetermined virtual space by the user. Hence, the user is able to have a high sense of immersion for the picture display which is performed in a game or the like with the assumption of a virtual space.

[16] As described above, the image display system is used in a game machine, an entertainment simulator or the like, and thus it is possible to make the user see a picture in the world of a virtual game or a picture of a tourist attraction, a museum or the like. It is also possible to use the image display system for a commercial simulator. As the commercial simulator, the image display system is able to be used, for example, to confirm an urban landscape in an urban development, to visually recognize the interior or the exterior of a construction regardless of the size thereof or to visualize a molecular structure which is not able to be normally observed with the naked eye, such as data of a three-dimensional structure of a carbon nanotube, a protein or the like. The image display system is able to be utilized as a large monitor display which monitors the state of a plant, various types of infrastructures or the like or as a monitor display when a remote operation is performed on the facilities thereof or the like. In this case, a liquid crystal display or the like which has already been provided is utilized as the panel display unit of the present disclosure, the image display system is configured by combination with the retinal scanning display unit and thus it is possible to effectively utilize the existing facilities.

[17] Part of the configuration realized by hardware in each of the embodiments described above may be replaced by software. At least part of the configuration realized by software is able to be realized by a discrete circuit configuration. When part or all of the functions of the present disclosure are realized by software, the software (computer programs) is able to be provided in a form in which the software is stored in a computer-readable recording medium. The "computer-readable recording medium" is not limited to a portable recording medium such as a flexible disk or a CD-ROM, and includes internal storage devices within a computer such as a RAM, a ROM and the like and external storage devices, such as a hard disk, which are fixed to a computer. In other words, the "computer-readable recording medium" has a broad meaning including an arbitrary recording medium in which data packets are able to be fixed not temporarily but permanently.

The present invention is able to be utilized for various types of display devices such as an image processing device, a game machine and a virtual reality display device.

10, 10A, 10B: image display system
20: retinal scanning display device
21, 22: transparent display unit
24: video camera
26, 27: eye camera
28, 29: temple
31: relay optical path
35, 36: collimating lens
41, 42: optical module
50, 50A, 50B: panel display device
51 to 53: marker
58, 59: dome
60: image output device
61: CPU
62: memory
67: operation unit
70: external storage device
71: retinal scanning display unit interface
72: panel display unit interface
75: storage interface
80: optical control unit
81: R laser driver
82: G laser driver
83: B laser driver
84: first direction driver
86: second direction driver
88: image signal interface (I/F)
90: movement control unit
91: first displacement amount computation unit
92: second displacement amount computation unit
93: X axis driver
100: optical engine
101: base
105: silicon substrate
110: light source module
111 to 113: semiconductor laser 111: red laser
112: green laser
113: blue laser
117: collimating lens
120: planar optical multiplexer
121: first waveguide
122: second waveguide
123: third waveguide
125: clad layer
126: first multiplexer unit
127: second multiplexer unit
128: third multiplexer unit
129: phase control unit
130: mirror unit
132: mirror
134: first actuator
136: second actuator
140: first movement unit
150: second movement unit
200: projector
210: retroreflective screen

What is claimed is:

1. A retinal scanning display device including an optical system that emits, to a pupil of a user, a plurality of types of laser light having different wavelengths in a range of visible light, the retinal scanning display device comprising:
    a plurality of semiconductor lasers that respectively emit the types of laser light having different wavelengths;
    an optical multiplexer to which the plurality of the semiconductor lasers are attached, which individually receives the types of laser light having different wavelengths emitted from the plurality of the semiconductor lasers and which makes the types of laser light coaxially as combined laser light with a predetermined optical axis and output the combined laser light;
    a beam shaper that is provided on an output side of the optical multiplexer and that shapes the combined laser light output from the optical multiplexer into a light beam having a predetermined divergence or convergence angle;
    a direction-of-emission changer that changes, according to an image signal corresponding to an image to be formed, a direction of emission of the combined light beam output through the beam shaper within at least a plane intersecting the direction of emission;
    a detector that detects a position of the pupil of the user; and
    a regulator that integrally moves, according to the detected position of the pupil, an optical engine formed with the semiconductor lasers, the optical multiplexer, the beam shaper and the direction-of-emission changer so as to guide the light beam emitted from the direction-of-emission changer to the position of the pupil of the user.

2. The retinal scanning display device according to claim 1,
    wherein the regulator regulates, according to a displacement in the detected position of the pupil within a plane perpendicular to the optical axis, alignment within the plane perpendicular to the optical axis of the light beam output from the optical engine.

3. The retinal scanning display device according to claim 1,
    wherein the optical multiplexer is a planar optical multiplexer.

4. The retinal scanning display device according to claim 1,
    wherein the semiconductor lasers respectively emit the types of laser light in red, green and blue.

5. The retinal scanning display device according to claim 4,
    wherein the optical multiplexer includes:
        a waveguide for the red, a waveguide for the green and a waveguide for the blue;
        a first directional coupler and a second directional coupler that propagate blue light from the waveguide for the blue to the waveguide for the green; and
        a third directional coupler that propagates, in the waveguide for the green, between the first directional coupler and the second directional coupler, red light from the waveguide for the red to the waveguide for the green.

6. The retinal scanning display device according to claim 1,
    wherein the direction-of-emission changer includes a MEMS mirror.

7. The retinal scanning display device according to claim 1,
    wherein the beam shaper is a collimating lens that is fixed on the output side of the optical multiplexer.

8. An image display system that displays a predetermined image for a user such that the user is able to visually recognize the predetermined image, the image display system comprising:
    a head-mounted display device that incorporates the retinal scanning display device according to claim 1 for both eyes and that scans, with the light beams, positions of retinas of the eyes of the user so as to display a first image focused on a position a first distance apart from positions of the eyes of the user;
    a line-of-sight detection unit that detects the positions of the pupils of and a direction of a line of sight of the user who wears the head-mounted display device;
    a panel display device that displays a second image different from the first image on a panel provided in a position a second distance shorter than the first distance apart from the user; and
    an image output unit
        that outputs, to the head-mounted display device, the image signal for the first image serving as a part assumed from the predetermined image to be present in the detected direction of the line of sight of the user and
        that outputs, as the second image, to the panel display device, an image complementary to the first image for the predetermined image.

9. The image display system according to claim 8,
    wherein the panel display device has such a panel size that an angle of view seen by the user is equal to or more than 60 degrees and equal to or less than 180 degrees in a horizontal direction and is equal to or more than 40 degrees and equal to or less than 120 degrees in a vertical direction.

10. The image display system according to claim 8,
    wherein in the image output unit, the first image displayed with the light beams on the eyes of the user in the head-mounted display device is an image for a stereoscopic view that causes parallax in the eyes.

11. The image display system according to claim 8, wherein the panel display device includes:
   a screen in which a retroreflective member is installed on a surface of the panel; and
   a projector which projects the second image from near a head of the user toward the screen.

* * * * *